(12) United States Patent
Boersma

(10) Patent No.: US 11,975,393 B2
(45) Date of Patent: May 7, 2024

(54) COLLET AND ASSEMBLY FOR MOUNTING A WORKPIECE TO A MILLING MACHINE

(71) Applicant: Drew Boersma, Ada, MI (US)

(72) Inventor: Drew Boersma, Ada, MI (US)

( * ) Notice: Subject to any disclaimer, the term of this patent is extended or adjusted under 35 U.S.C. 154(b) by 0 days.

(21) Appl. No.: 17/546,135

(22) Filed: Dec. 9, 2021

(65) Prior Publication Data

US 2022/0184713 A1 Jun. 16, 2022

Related U.S. Application Data

(60) Provisional application No. 63/123,830, filed on Dec. 10, 2020, provisional application No. 63/123,836, filed on Dec. 10, 2020.

(51) Int. Cl.
*B23B 31/20* (2006.01)
*B23C 9/00* (2006.01)

(52) U.S. Cl.
CPC .............. *B23B 31/20* (2013.01); *B23C 9/00* (2013.01); *B23C 2220/48* (2013.01)

(58) Field of Classification Search
CPC ............ B23C 2270/08; B23C 2210/16; B23C 2210/161; B23C 2220/48; B23B 31/20; B23B 31/102
See application file for complete search history.

(56) References Cited

U.S. PATENT DOCUMENTS

| | | | |
|---|---|---|---|
| 3,537,714 A | 11/1970 | Anderson | |
| 3,837,661 A * | 9/1974 | Phillippi | B23B 31/142 |
| | | | 279/131 |
| 4,768,269 A | 9/1988 | Williams | |
| 5,096,213 A | 3/1992 | Terwilliger et al. | |
| 7,673,882 B2 | 3/2010 | Tanga | |
| 8,534,653 B2 | 9/2013 | Huisken et al. | |
| 9,457,411 B2 | 10/2016 | Kiontke | |

OTHER PUBLICATIONS

Wikipedia, Article on Collets.

* cited by examiner

*Primary Examiner* — Christopher J Besler
(74) *Attorney, Agent, or Firm* — Mitchell Intellectual Property Law, PLLC

(57) ABSTRACT

A milling machine can include a chuck and at least one tool. The chuck is rotatable about a first rotational axis and has clamping jaws. The at least one tool is movable relative to the first rotational axis. An assembly for the milling machine includes a workpiece and a collet. The collet includes fingers affixing the collet to the workpiece. The collet also includes a chuck mount receivable within the chuck. The chuck is rotatable about a first rotational axis and has clamping jaws. The at least one tool is movable relative to the first rotational axis. An assembly for the milling machine includes a workpiece and a collet. The collet includes fingers affixing the collet to the workpiece. The collet also includes a chuck mount receivable within the chuck.

11 Claims, 27 Drawing Sheets

COLLET AND ASSEMBLY FOR MOUNTING A WORKPIECE TO A MILLING MACHINE

CROSS REFERENCE TO RELATED APPLICATION

This application claims priority to provisional patent application Ser. Nos. 63/123,830 and 63/123,836, both filed Dec. 10, 2020, and incorporated herein by reference.

BACKGROUND

Various machines and assemblies can be used for machining a workpiece to produce a finished product. Generally, such machines can be referred to as a milling machine, with a computer numerical control (CNC) machine being a common example. Such milling machines can hold a workpiece stationary and/or move the workpiece, including, for example, rotating the workpiece, during the machining process. Such machines can any one or more of a variety of tools, such as cutting tools, drill bits, reamers, sanding tools, or the like, for performing machining operations on the workpiece. When multiple tools are included, they can be mounted to a turret or individually selectable by the machine.

The milling machine typically includes one or more chucks, each with clamping jaws, for holding the workpiece during machining. Precise positioning and alignment of the workpiece within the milling machine is important in performing the machining operations on the workpiece to ensure that the workpiece is properly machined into the desired finished product by movement of the workpiece and movement of the machining tools of the milling machine.

Conventional workpiece setup and, positioning methods require milling machine operators to manually place and align each workpiece within the chuck(s) of the milling machine. Utilizing such conventional manual workpiece setup and positioning methods can be time consuming, resulting in machining methods that are costly due to the amount of labor and machine time used.

BRIEF DESCRIPTION

An aspect of the present disclosure relates to a method of mounting a workpiece to a milling machine having a chuck with clamping jaws, the method comprising mounting a collet to the workpiece by moving fingers of the collet to an unclamped position, where a portion of the workpiece can be received between the fingers, and moving the fingers of the collet to a clamped position, where the portion of the workpiece is clamped between the fingers, and mounting the collet, while mounted to the workpiece, to the chuck by inserting at least a portion of the collet into the chuck, and applying a clamping force from the clamping jaws to the fingers to increase the clamping force applied by the fingers to the workpiece.

Another aspect of the present disclosure relates to an assembly for a milling machine comprising a chuck, rotatable about a first rotational axis and having clamping jaws, and at least one cutting tool movable relative to the first rotational axis, the assembly comprising a workpiece, and a collet comprising resilient fingers applying a clamping force affixing the collet to the workpiece and a chuck mount receivable within the chuck.

Yet another aspect of the present disclosure relates to a collet for mounting to a workpiece and receivable within a milling machine chuck having clamping jaws, the collet comprising a clamp assembly comprising multiple fingers arranged in spaced relation to define a gap, the multiple fingers being deflectable from a clamping position to a non-clamping position, and a piston assembly having a mandrel movable between a retracted position to an extended position to move the fingers from the clamping position to non-clamping position.

Yet another aspect of the present disclosure relates to a method of automatic loading of a workpiece into a milling machine having a rotating chuck, the method comprising moving the workpiece along a conveyor to an indexed position corresponding to alignment of a collet mounting station and a collet mounting location on the workpiece, when the workpiece is in the indexed position, mounting at least one collet to the workpiece at the collet mounting location to form a workpiece assembly comprising the workpiece and the at least one collet, and carrying the workpiece assembly with a robotic arm to the milling machine and inserting the at least one collet into the chuck.

DETAILED DESCRIPTION

Figure 1:
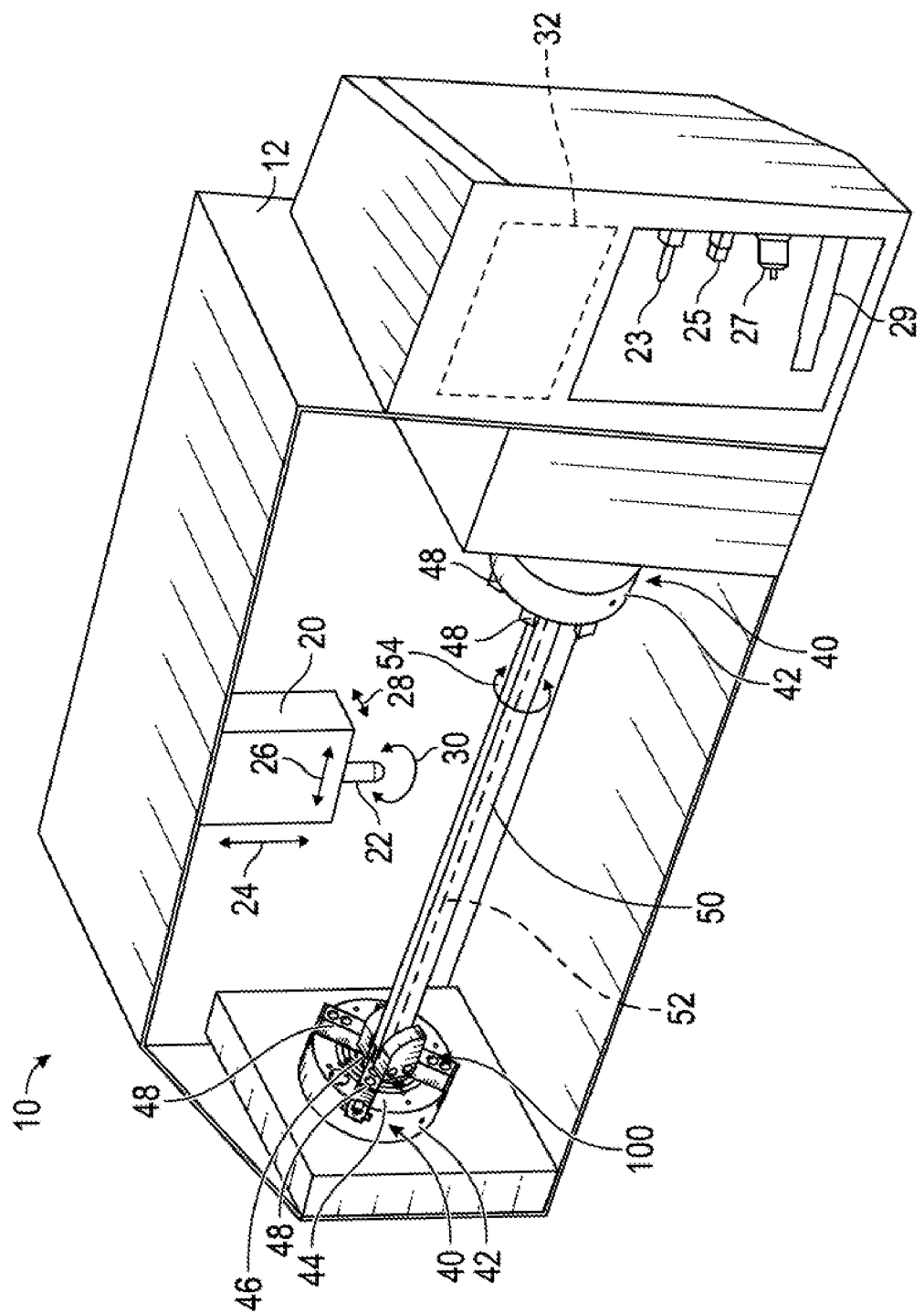
FIG. 1 is a schematic perspective view of a machine, for machining a workpiece, illustrated herein as a milling machine, including a chuck and a workpiece mounted to the chuck by a collet.

FIG. 1 illustrates a milling machine 10, capable of implementing machining cycles of operation on a workpiece 50. The milling machine 10 can be any suitable type of milling machine 10 for machining the workpiece 50, non-limiting examples of which include a CNC milling machine, a CNC turning center, a CNC lathe, or other suitable type of tool and die assembly for machining the workpiece 50. The workpiece 50 can have a variety of shapes and sizes, non-limiting examples of which include a beam, a bar, a parallel, a sheet, a panel, which can be symmetrical or non-symmetrical and can include a variety of corners and/or angled edges, a part for a machine or vehicle, or any other shape or size that can be accommodated within the milling machine 10. Further, the workpiece 50 can comprise a variety of materials to be machined, such as, by way of non-limiting example, a metal workpiece 50. By way of non-limiting example, the workpiece 50 can have a weight of up to 1,000 pounds, further at least 1,000 pounds, further at least 2,000 pounds. The milling machine 10 shares many features of a conventional milling machine, which may not be described in detail herein except as necessary for a complete understanding of aspects of the disclosure.

The milling machine 10 has a variety of systems, some of which are manually or computer controllable, to implement the cycles of machining operation. A chassis or cabinet 12 is provided to contain and/or support the variety of systems for implementing the machining operations. The cabinet 12 can at least partially enclose the components of the milling machine 10. In one example, the milling machine 10 comprises at least one machine tool, illustrated herein in the form of a cutting tool 20, for machining the workpiece 50. As illustrated herein, the cutting tool 20 comprises a cutter 22 for machining the workpiece 50. However, it will be understood that the cutting tool 20 is not limited to use with the cutter 22 as illustrated. Rather, the cutting tool 20 is configured for selective use with a wide variety of machining implements 23, 25, 27, 29, of which the cutter 22 is one example. The inventory of machining implements 23, 25, 27, 29 available for use can be provided with the milling machine 10 such that the machining implements 23, 25, 27, 29 can be selected and used by the milling machine 10, and specifically by the cutting tool 20. The machining implements 23, 25, 27, 29 can comprise other components than the cutter 22, such as a variety of different bits, cutters, drill bits, reamers, lathes, or the like, for performing machining operations on the workpiece 50 within the milling machine 10.

In the illustrated example, the cutting tool 20 is a CNC cutting tool 20 having a computer control system 32 for controlling the movement and operation of the cutting tool 20. The cutting tool 20 is movable relative to the workpiece 50. The cutting tool 20 can be movable in multiple directions relative to the workpiece 50, which can be referred to as axes of movement of the cutting tool 20 or of the milling machine 10. Further, milling machines 10 can be referred to in terms of the number of axes of movement provided between the cutting tool 20 and the workpiece 50 in a particular milling machine 10. In one non-limiting example, the milling machine 10 is provided as a four-axis milling machine 10 configured for movement in four axes between the cutting tool 20 and the workpiece 50. Specifically, the cutting tool 20 is configured for movement in four axes relative to the workpiece 50, such as in an upward and downward axis of movement as indicated by an arrow 24, in a forward and backward axis of movement as indicated by an arrow 26, in a side-to-side axis of movement as indicated by an arrow 28, and in a rotational axis of movement as indicated by an arrow 30. Additionally, or alternatively, rotational movement of the workpiece 50, such as in a rotational axis of movement as indicated by an arrow 54, can also define an axis of movement between the cutting tool 20 and the workpiece 50. Further, the cutter 22 can be rotatable relative to the cutting tool 20 and/or rotatable concurrently with the cutting tool 20. The cutting tool 20 can be movable in any suitable plane or direction such that the cutter 22 can be brought into contact with the workpiece 50 for machining the workpiece 50.

The cabinet 12 further houses at least one chuck 40, illustrated herein as a first chuck 40 and a second chuck 40, spaced from one another, to which the workpiece 50 can be mounted for supporting the workpiece 50 between the first and second chucks 40. By way of non-limiting example, the first and second chucks 40 can be spaced from one another at a sufficient distance to accommodate workpieces 50 having a length of up to 96 inches to be mounted and supported between the first and second chucks 40. In the present example, the first and second chucks 40 securely hold and position the workpiece 50 during machining operations. However, it will be understood that the milling machine 10 could include only one chuck 40, such that the workpiece 50 is supported entirely at one end by the single chuck 40.

The at least one chuck 40 comprises a chuck body 42 having a front surface 44 facing inwardly from the cabinet 12, toward the workpiece 50. As illustrated herein, the chuck body 42 can have a cylindrical shape, though it will be understood that the chuck body 42 is not limited to such a cylindrical shape. The chuck 40 can be rotatable about an axis of rotation 52 defined as the axis of rotation 52 of the chuck body 42. The front surface 44 defines a chuck opening 46. A set of clamping jaws 48 is coupled to the chuck body 42 such that the clamping jaws 48 protrude inwardly from the front surface 44, toward the workpiece 50, and are positioned about the chuck opening 46. As used herein, the term set refers to any suitable number of clamping jaws 48, including only a single clamping jaw 48. As illustrated herein, the chuck 40 comprises a set of four clamping jaws 48 evenly spaced about the circumference of the chuck opening 46, though it will be understood that the chuck 40 is not limited to such a four jaw 48 configuration, as illustrated, and that any suitable number or size of clamping jaws 48 can be provided. By way of non-limiting example, the chuck 40 is an 18-inch chuck 40, such that the chuck body 42 has a diameter of 18 inches, with each of the clamping jaws 48 having a height of 6½ inches. While the first and second chucks 40 are illustrated herein as having the same structure and the same clamping jaws 48 as one another, it will be understood that the first and second chucks 40 need not have the same structure as one another and can instead support the workpiece 50 in any suitable different manner, such as by having a differently shaped chuck body 42 or by including a different number of clamping jaws 48.

The workpiece 50 can be mounted to the chuck 40 by a collet 100. The collet 100 canoe mounted to the workpiece 50, then mounted to the chuck 40 to mount the workpiece 50 to the chuck 40. The collet 100 is at least partially received within the chuck opening 46 and positioned such that the clamping jaws 48 selectively bear inwardly against the collet 100 to clamp the collet 100 within the chuck 40. When the collet 100 is mounted to the workpiece 50 and within the chuck 40, the workpiece 50 is clamped within the collet 100 and the collet 100 is clamped within the chuck 40 such that the collet 100 does not move relative to the chuck 40, and the workpiece 50 does not move relative to the collet 100. Thus, the workpiece 50 also does not move relative to the chuck 40. Rather, the rotation of the chuck 40 about the axis of rotation 52, such as for bidirectional rotation about the axis of rotation 52, as indicated by the arrow 54, in turn rotates the collet 100 and the workpiece 50 about the same axis of rotation 52, effectively aligning the rotational axes 52 of the workpiece 50, the collet 100, and the chuck 40. Therefore, as the cutting tool 20 is movable relative to the workpiece 50 in the axes of movement 24, 26, 28, 30, the cutting tool 20 is also then movable relative to the rotational axis 52 of the chuck 40 in the same axes of movement 24, 26, 28, 30. It will be understood that the workpiece 50 can be mounted to the milling machine 10 by the use of only one collet 100 at only one end of the workpiece 50, or the workpiece 50 can be mounted to the milling machine 10 by collets 100 provided at each end of the workpiece 50.

Figure 2:
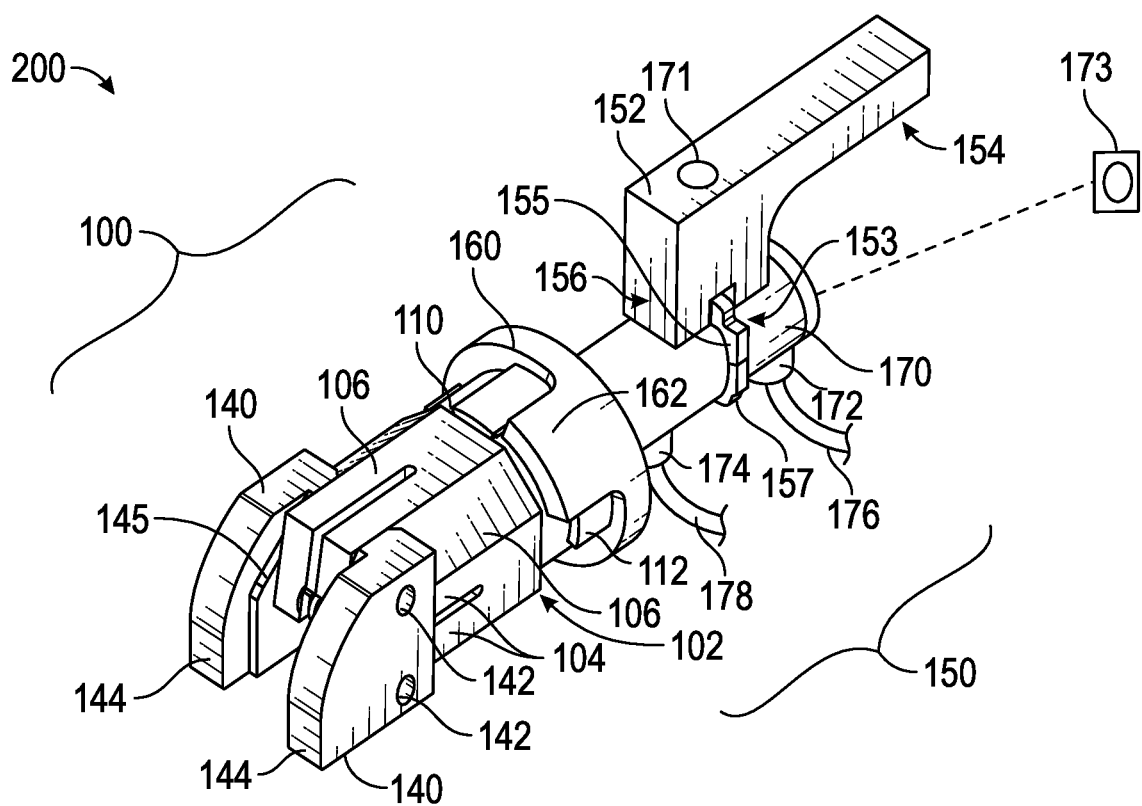
FIG. 2 is a perspective view of a handheld collet assembly including the collet of FIG. 1 in combination with a removable handheld actuating assembly including a handle.

Turning now to FIG. 2, the collet 100 is removably coupled with a handheld actuating assembly 150 such that the collet 100 coupled to the handheld actuating assembly 150 can be thought of as collectively forming a handheld collet assembly 200. The collet 100 comprises a collet body 102 defining multiple fingers 104 and further defining a base, illustrated herein as a first coupling 110 that can be further thought of as serving as a chuck mount. The first coupling 110 includes at least one rib 112, While the collet 100 is illustrated herein as defining four fingers 104, it will be understood that any suitable number of fingers 104 can be included. At least one of the fingers 104 defines at least one planar facet, illustrated herein in the form of a flat 106. In one example, and as illustrated herein, each of the fingers 104 define at least one flat 106. In one example, the fingers 104 are spaced from one another such that the fingers 104 do not contact one another. By way of non-limiting example, it is contemplated that the collet 100 can be formed by being machined from a single monolithic piece of material, such as metal, with the spacing between the fingers 104 created by machining gaps between the fingers 104 from the single piece of metal.

The collet 100, such as specifically the fingers 104, further comprises at least one clamp element 140. As illustrated herein, the collet 100 includes two opposing, spaced clamp elements 140 coupled to the fingers 104. The clamp elements 140 each define at least one fastener opening 142 through which a fastener (not shown) can mount the clamp elements 140 to the fingers 104. Optionally, the fastener can removably mount the clamp elements 140 to the fingers 104. While the clamp elements 140 as illustrated herein each define two fastener openings 142 for attachment of each clamp element 140 to two of the fingers 104, it will be understood that each of the clamp elements 140 could alternatively be provided as separate upper and lower clamp elements 140, each having a single fastener opening 142 for attachment to a single finger 104, such that each finger 104 comprises its own independent clamp element 140.

The clamp elements 140 further comprise at least one clamp tooling 144 that is configured to further contact, grip, and clamp against the workpiece 50. The size, shape, and dimensions of the clamp elements 140 and the clamp toolings 144 can be designed to be specifically compatible with and complementary to the shape of the given workpiece 50 to which the collet 100 is to be mounted to provide customizability for the collet 100 in mounting to workpieces 50 having a variety of shapes and sizes. Non-limiting examples of such structures that can be used for the clamp toolings 144 include outset jaws, inset jaws, and standard jaw toolings. In one non-limiting example, at least one the clamp elements 140, or each of the clamp elements 140, can further comprise an angled portion 145 that can be thought of as acting as a second clamp tooling to further contact, grip, and clamp against at least some workpieces 50. In one such example, workpieces 50 having angled ends can be at least partially supported by the angled portions 145.

The handheld actuating assembly 150 comprises a handle 152, a second coupling 160, and an actuator assembly, illustrated herein as a piston assembly 170. The handle 152 is mounted to the piston assembly 170. In one non-limiting example, a fastening ring 153 mounts the handle 152 to the piston assembly 170. The fastening ring 153 can comprise an upper portion 155 that is coupled to the handle 152 and a lower portion 157, such that the upper portion 155 and the lower portion 157 collectively form the fastening ring 153 provided about the circumference of the piston assembly 170. The handle 152 can be coupled to the upper portion 155 by any suitable way, non-limiting examples of which include coupling by a fastener (not shown), integrally forming the upper portion 155 with the handle 152, or by welding. Similarly, the upper portion 155 and the lower portion 157 can be coupled together in any suitable way, non-limiting examples of which include by the use of fasteners, by clamping, or by welding. Alternatively, rather than using the fastening ring 153, the handle 152 can be mounted to the piston assembly 170 by any other suitable method, such as by the use of at least one fastener (not shown) or by other attachment methods, such as welding.

The handle 152 comprises a grip portion 154 and a mounting portion 156. The grip portion 154 can be shaped and sized such that the grip portion 154 is configured to be easily gripped by the hand of a user. The mounting portion 156 mounts to the piston assembly 170, such as via the fastening ring 153, to couple the grip portion 154 to the piston assembly 170. The second coupling 160 extends from the piston assembly 170, away from the handle 152, and is configured to selectively couple with the first coupling 110 of the collet 100. The first coupling 110 of the collet 100 and the second coupling 160 of the handheld actuating assembly 150 can be thought of as first and second halves collectively forming a connector for selectively coupling the collet 100 with the handheld actuating assembly 150. In one example, as illustrated herein, the connector formed by the first and second couplings 110, 160 is provided as a bayonet connector or a bayonet mount between the first and second couplings 110, 160. The second coupling 160 includes at least one tab 162 extending outwardly from the second coupling 160, away from the handle 152, that is configured to cooperate with the rib 112 of the first coupling 110 of the collet 100 to selectively couple the collet 100 with the handheld actuating assembly 150.

The piston assembly 170 defines a first fluid flow coupling 172 and a second fluid flow coupling 174. A first fluid conduit 176 and a second fluid conduit 178 are fluidly coupled to the first and second fluid flow couplings 172, 174, respectively. Fluid, such as, by way of non-limiting example, water, a lubricant, or air, can be provided to and from the piston assembly 170 through the fluid flow couplings 172, 174 and the fluid conduits 176, 178. The fluid conduits 176, 178 operably and fluidly couple the piston assembly 170 to pressurized fluid sources (not shown) to actuate the piston assembly 170, and therefore also the handheld actuating assembly 150. Any suitable type of actuator can be operably coupled to and used for actuating the piston assembly 170, such as a button 171 or trigger on the handle 152, or a foot pedal 173 that can be provided nearby. Though the fluid conduits 176, 178 couple the handheld actuating assembly 150 to the pressurized fluid sources, the handheld actuating assembly 150 functions as a portable, handheld unit that can removably couple with the collet 100.

Figure 3:
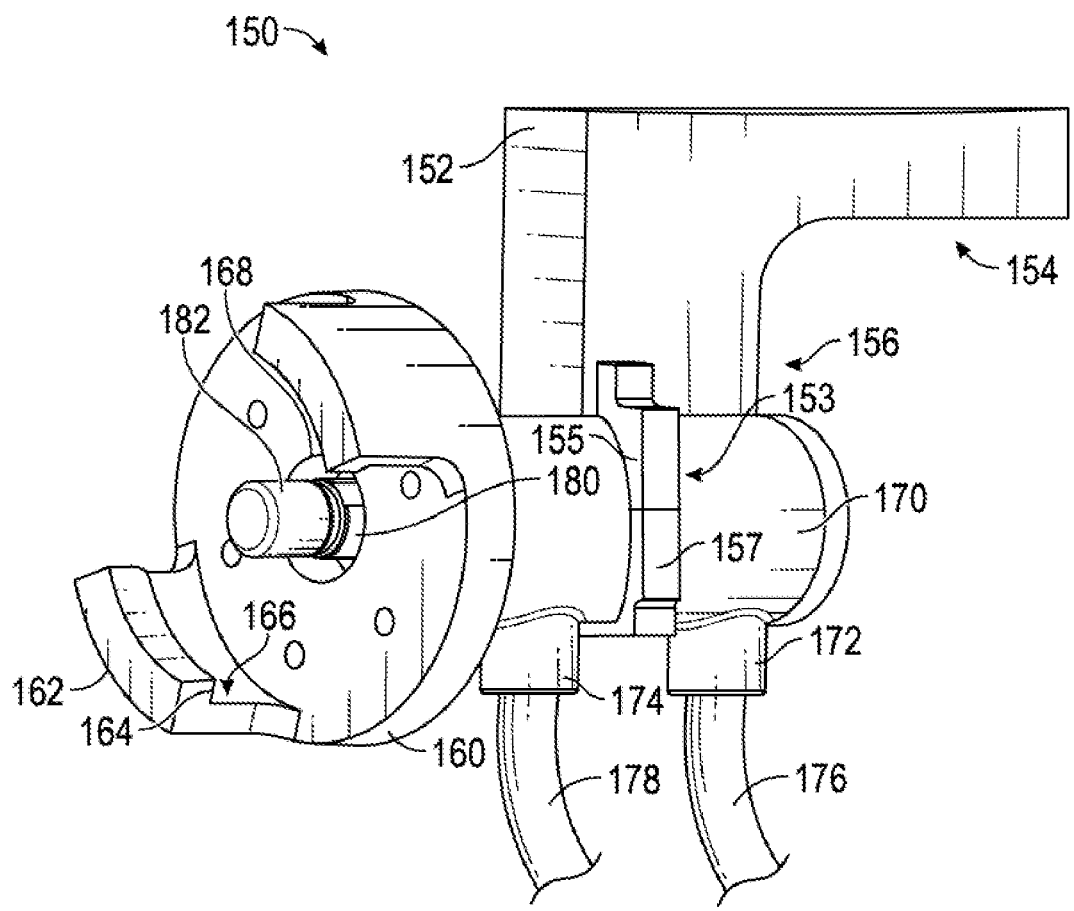
FIG. 3 is a perspective view of the handheld actuating assembly of FIG. 2 with the handheld actuating assembly removed from the collet.

Turning now to FIG. 3, the handheld actuating assembly 150 is shown without the collet 100 to better see the details of the handheld actuating assembly 150. The second coupling 160 is illustrated herein as comprising two tabs 162, though it will be understood that any suitable number of tabs 162 can be included. Each tab 162 extends outwardly from the second coupling 160, away from the piston assembly 170, to define a lug 164 that extends radially inwardly from the tab 162. The lug 164, together with the tab 162, collectively define a channel 166 within which the rib 112 of the first coupling 110 of the collet 100 can be at least partially received to couple the collet 100 to the handheld actuating assembly 150.

The second coupling 160 further defines an opening 168 that couples with the piston assembly 170. A piston, which is illustrated herein as an actuator shaft 180, is at least partially received within the piston assembly 170 and also at least partially protrudes out of the piston assembly 170 through the opening 168. The actuator shaft 180 is illustrated herein in a first, retracted position. Specifically, the actuator shaft 180 comprises an actuator head 182, with at least a portion of the actuator head 182 extending through the opening 168 when the actuator shaft 180 is in the retracted position as shown.

Figure 4:
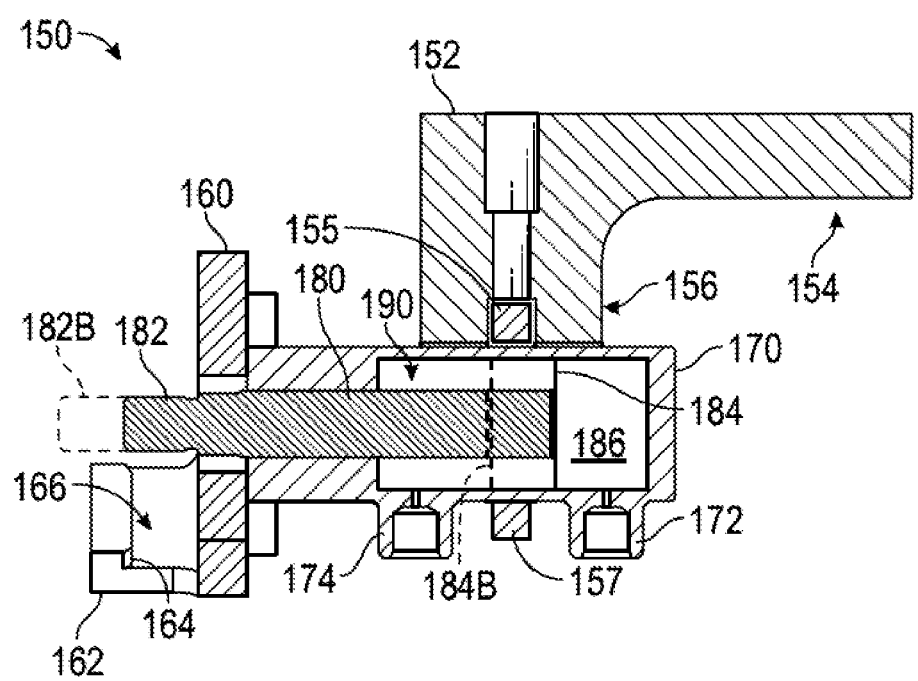
FIG. 4 is a longitudinal cross-sectional view of the handheld actuating assembly of FIG. 3.

Turning now to FIG. 4, the piston assembly 170 further defines an interior 190, with the actuator shaft 180 at least partially received within the interior 190. An actuating partition 184 can be provided within the interior 190 and can at least partially define an actuating chamber 186 within the interior 190. The actuating partition 184 is configured to fluidly isolate the actuating chamber 186 from the remainder of the interior 190, such that the actuating chamber 186 and the remainder of the interior 190 are not in fluid communication. Further, the first fluid flow coupling 172 is fluidly coupled with the actuating chamber 186, while the second fluid flow coupling 174 is fluidly coupled with the remaining interior 190. As illustrated herein, the actuating partition 184, the actuator shaft 180, and the actuator head 182 are shown in the first, retracted position. However, dashed lines show the actuating partition 184B and the actuator head 182B in a second, extended position, where the actuating chamber 186 is expanded in size and the actuator shaft 180 and the actuator head 182 protrude further outwardly from the piston assembly 170 as compared to the retracted position.

Figure 5:
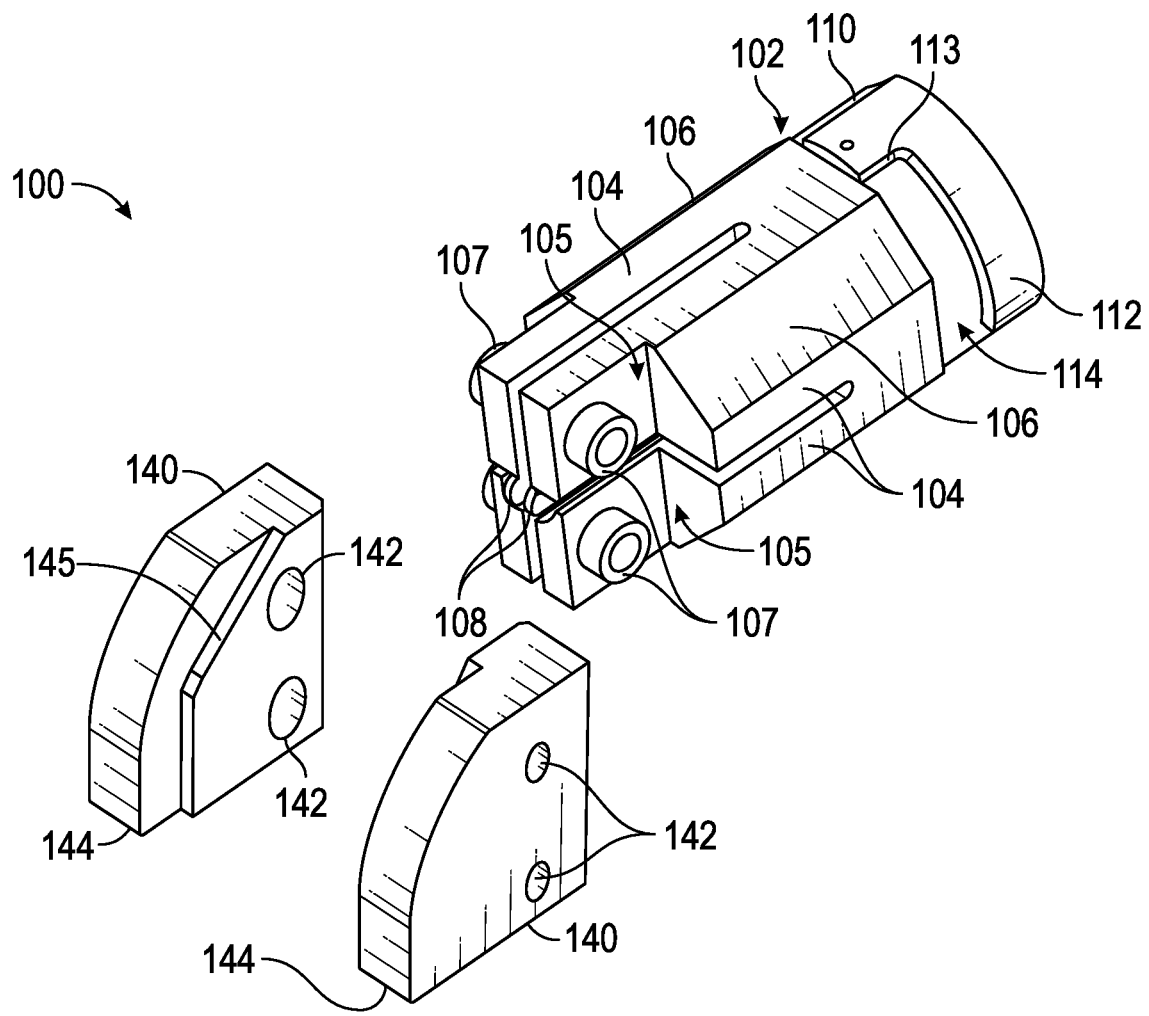
FIG. 5 is a partially exploded perspective view of the collet of FIG. 2, including clamp elements, with the handheld actuating assembly removed.

Turning now to FIG. 5, the collet 100 is shown in an exploded view for improved clarity. The first coupling 110 and the rib 112 collectively at least partially define a channel 114. The first coupling 110 further comprises an axial portion of the rib 112 that forms a rotational stop 113 for the channel 114, such that the rotational stop 113 further at least partially defines the channel 114. The channel 114 is shaped, sized, and positioned such that, when the collet 100 is coupled with the handheld actuating assembly 150 to form the handheld collet assembly 200, the rib 112 of the first coupling 110 is received within the channel 166 of the second coupling 160, and the lug 164 is likewise received within the channel 114, such as abutting or bearing against the rotational stop 113, to couple the collet 100 with the handheld actuating assembly 150.

As illustrated herein, each of the fingers 104 can, optionally, further define a receiving notch 105 that is shaped and sized to be complementary to the clamp elements 140 to at least partially receive the clamp elements 140 for mounting to the fingers 104. Each of the fingers 104 further yet includes a fastener boss 107 that is positioned to align with the fastener openings 142 of the clamp elements 140 in order to mount the clamp elements 140 to the fingers 104. While each of the fingers 104 are illustrated herein as including a notch 105 and a fastener boss 107, it will be understood that it is also contemplated that less than all of the fingers 104 can include the notch 105 and the fastener boss 107.

The collet 100 optionally further includes an index for relatively aligning the collet 100 with the workpiece 50. While any suitable index may be used, as illustrated, at least one of the fingers 104 comprises a key, illustrated herein in the form of a projection 108, that functions as the optional index. In one non-limiting example, the projection 108 extends outwardly from the end of the at least one finger 104, away from the first coupling 110. The projection 108 is sized, positioned, and shaped to protrude into the space between the clamp elements 140 and is configured to function as the index for the relative alignment of the workpiece 50 and the collet 100 when the collet 100 is mounted to the workpiece 50. As illustrated herein, two of the fingers 104 comprise projections 108, though it will be understood that only one of the fingers 104, none of the fingers 104, or even all of the fingers 104, or any number of fingers 104 in between, can comprise projections 108. Further, the projections 108 on different fingers 104 can have the same shape, size, and positioning, or could have differing shape, size, or positioning relative to the respective finger 104. By way of non-limiting example, the projections 108 can be provided as lugs, nubs, protuberances, wedge members, pins, flanges, tabs, having tapered or non-tapered surfaces, or any other suitable structure for forming the key for the index.

Figure 6:
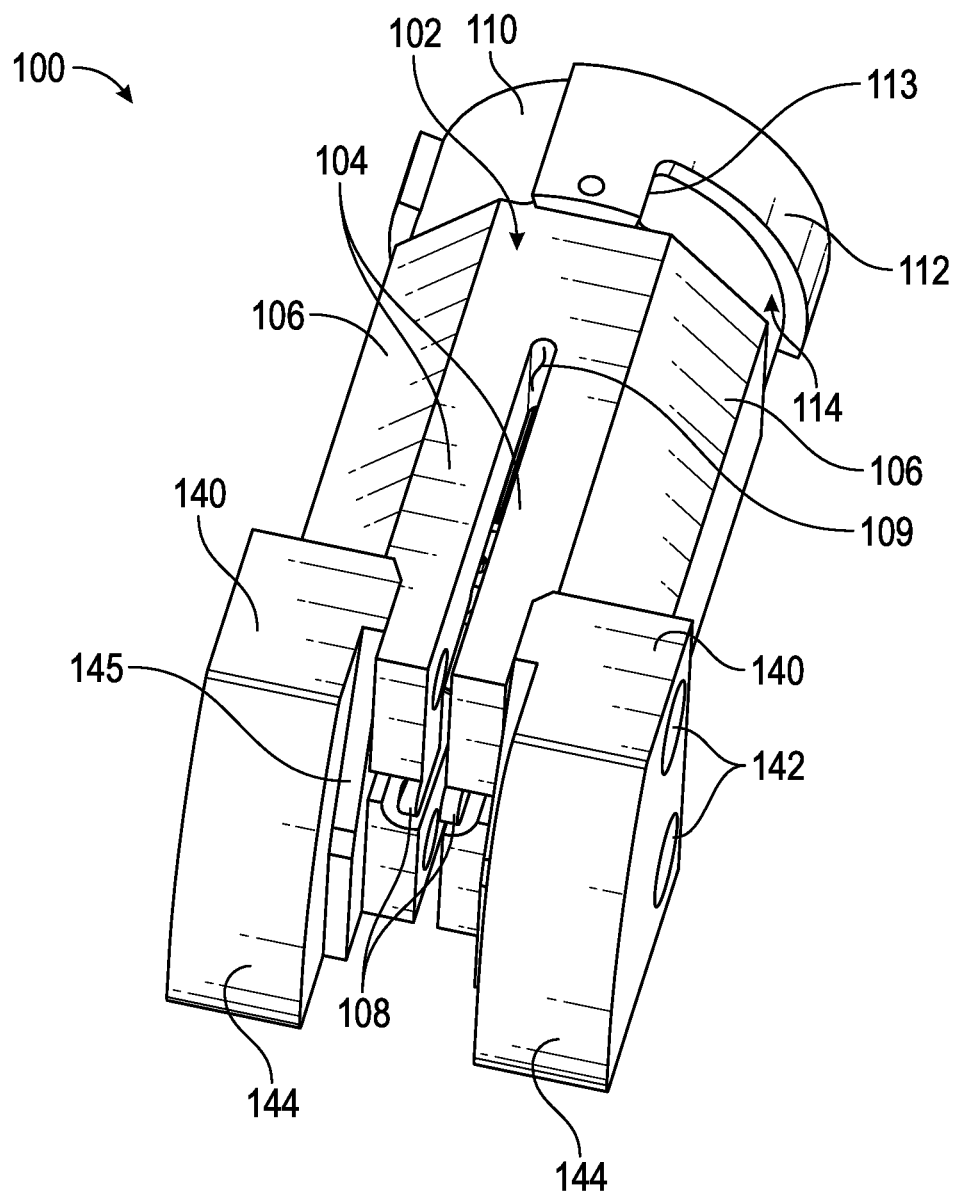
FIG. 6 is a perspective view of the collet of FIG. 5, with the clamping elements attached.

Turning now to FIG. 6, the clamp elements 140 are mounted to the collet 100 via the fingers 104. The projections 108 can be seen extending from the fingers 104 in the space between the clamp elements 140. Further, the spacing between the fingers 104 is shown such that a gap 109 is defined between neighboring fingers 104. The fingers 104 can be made or formed in such a way, and/or can be made or formed from a specifically selected material, so as to be sufficiently inherently resilient such that the gap 109 between the fingers 104 is maintained at a predetermined width, absent the action of other outside forces acting on the fingers 104.

Figure 7:
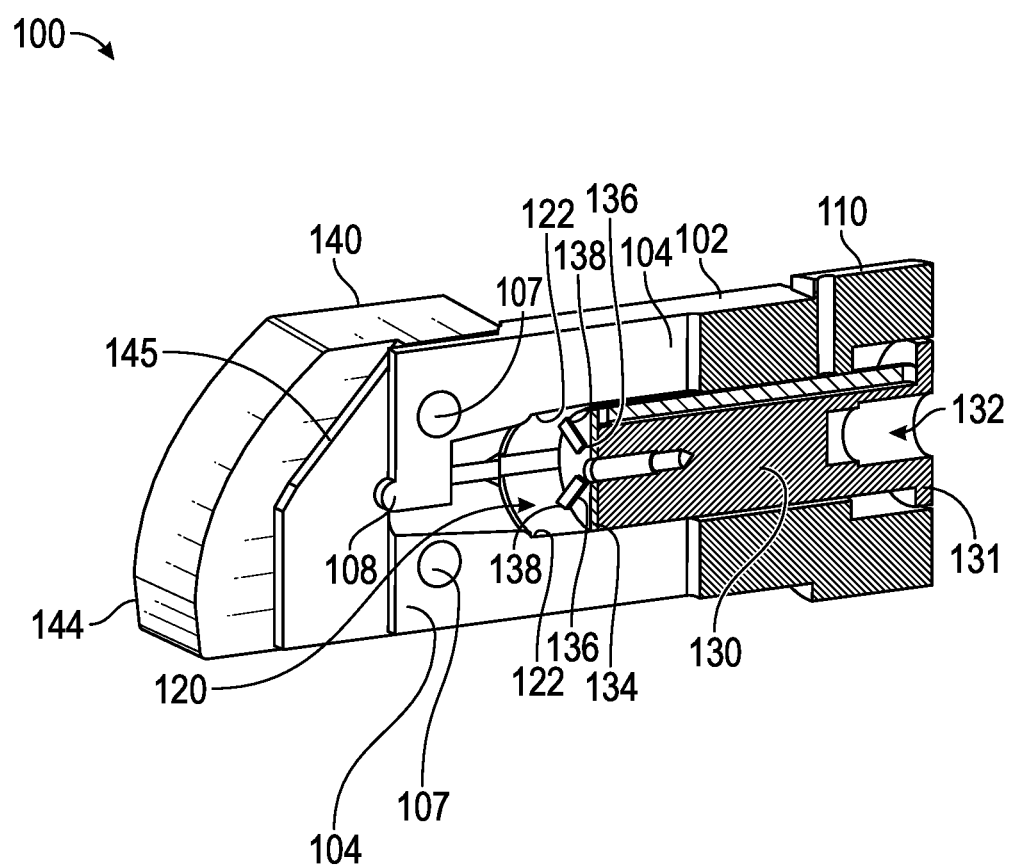
FIG. 7 is a perspective longitudinal cross-sectional view of the collet of FIG. 6.

Turning now to FIG. 7, the collet body 102, including the first coupling 110 and the fingers 104, at least partially defines a collet interior 120. Specifically, at least one of the fingers 104 comprises an interior ramp surface 122 that defines at least part of the collet interior 120. In one example, each of the fingers 104 comprises the interior ramp surface 122 to define at least part of the collet interior 120. By way of non-limiting example, in the specific example as illustrated herein, the interior ramp surfaces 122 of the fingers 104 defining the collet interior 120 collectively form a truncated cone that decreases in width or in cross-sectional area moving towards the ends of the fingers 104 coupled to the clamping elements 140. A piston, which is illustrated herein in the form of a mandrel 130, is slidably received within the collet interior 120 so as to be extendable into the collet interior 120. By way of non-limiting example, as illustrated herein, the mandrel 130 has a cylindrical shape defining a constant diameter or cross-sectional area. With the mandrel 130 being slidably extendable into the collet interior 120, the mandrel 130 having the constant width selectively interacts with the interior ramp surfaces 122 forming the truncated cone shape as the mandrel 130 extends into the collet interior 120. Such an interaction between the constant-width mandrel 130 and the truncated cone collet interior 120 can be thought of as creating a 3-D wedge structure, though it will be understood that other wedge structures are also contemplated, such as a 2-D wedge structure.

The mandrel 130 further defines an axial stop 131 provided at the end of the mandrel 130 opposite the fingers 104. The axial stop 131 can be configured to limit the extent to which the mandrel 130 can move forward into the collet interior 120 by coming to bear against a surface of the collet interior 120 as the mandrel 130 moves forward into the collet interior 120. The mandrel 130 also further comprises an actuator opening 132 positioned at the end of the mandrel 130 adjacent the first coupling 110. The actuator opening 132 is shaped, positioned, and configured to selectively operably couple the mandrel 130 with the handheld actuating assembly 150 when the handheld actuating assembly 150 is coupled with the collet 100, such that the mandrel 130 can be thought of as comprising a portion of the handheld actuating assembly 150, and thus also comprising a portion of the piston assembly 170.

By way of non-limiting example, the mandrel 130 can further include a ramped surface for selectively contacting and bearing against the interior ramp surfaces 122 of the fingers 104 so as to more gradually bear against the interior ramp surfaces 122 as compared to the mandrel 130 having a constant width and not including a ramped surface. At an end of the mandrel 130, opposite the actuator opening 132, the mandrel 130 can further comprise a mandrel head 134. While any suitable ramped surface may be used, in one example, the ramped surface can be defined by the mandrel head 134 itself, such that the mandrel head 134 can have a non-constant diameter decreasing in diameter towards the fingers 104. In another example, and as illustrated herein, the mandrel head 134 defines at least one mounting slot 136 within which the ramped surface is received, the ramped surface illustrated herein, by way of non-limiting example, in the form of at least one roller or wheel 138. The at least one roller or wheel 138 is received within the at least one mounting slot 136 and is positioned to extend radially outwardly beyond the circumference of the mandrel head 134. Regardless of whether the ramped surface is defined by the mandrel head 134 itself or an additional element provided with the mandrel head 134, such as the wheel 138, the ramped surface of the mandrel head 134 can selectively contact, conform to, and bear against the interior ramp surfaces 122 of the fingers 104.

Figure 8:
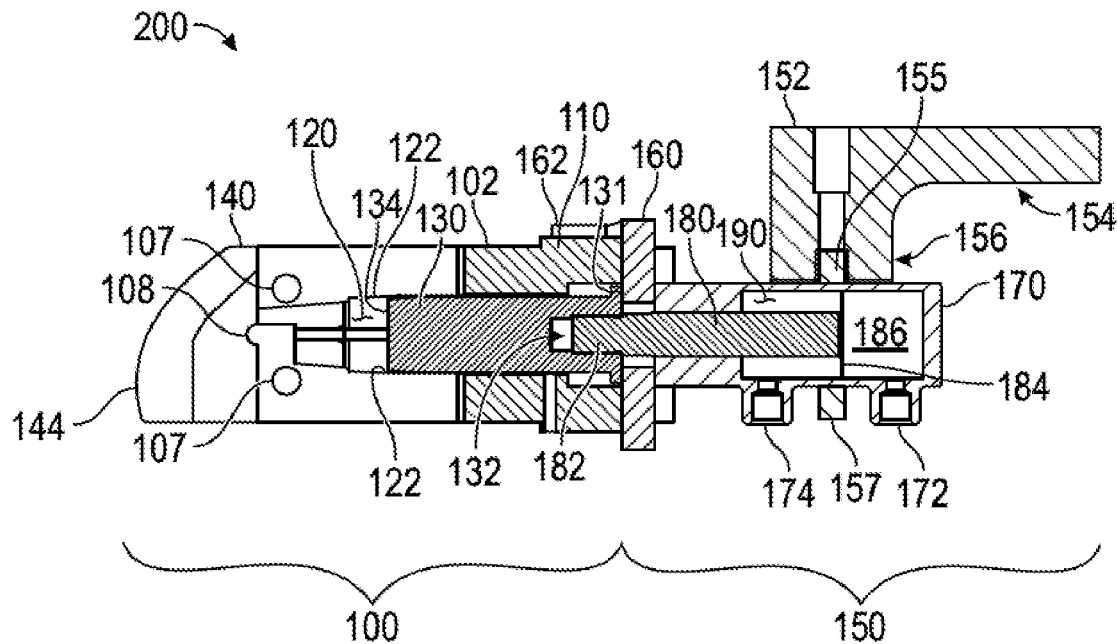
FIG. 8 is a longitudinal cross-sectional view of the handheld collet assembly of FIG. 2 with the handheld actuating assembly including a mandrel shown in a retracted position.
Figure 9:
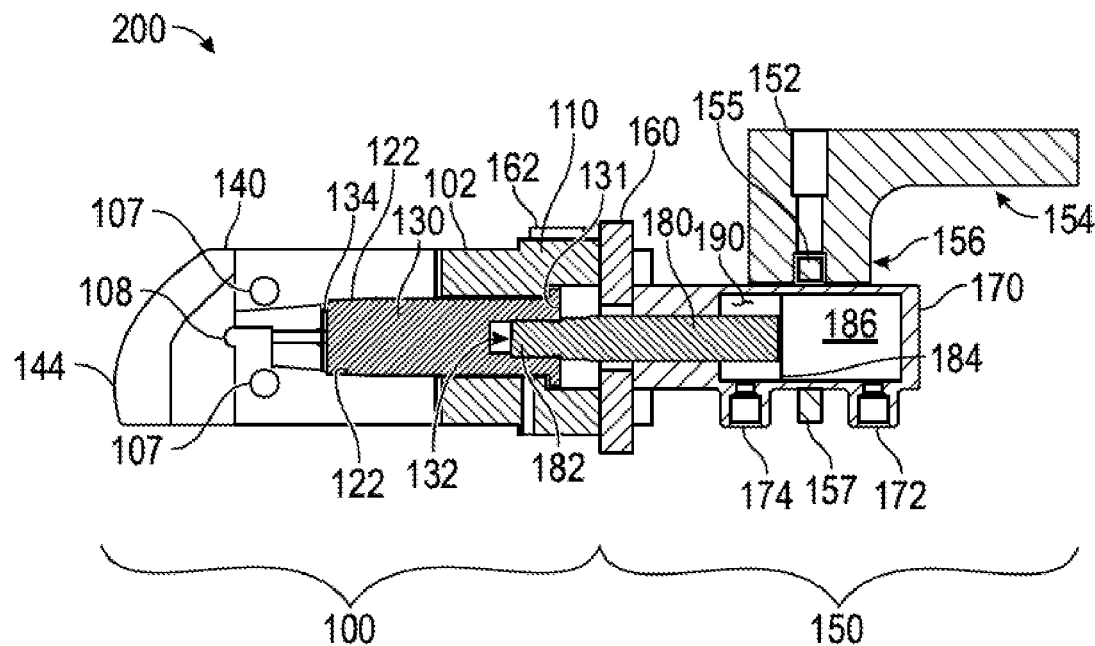
FIG. 9 is a longitudinal cross-sectional view of the handheld collet assembly of FIG. 8 with the mandrel shown in an extended position.

The general operation of the handheld collet assembly 200 will be described with respect to FIG. 8 and FIG. 9, which show the collet 100 in a clamping position (FIG. 8) and an unclamped position (FIG. 9). In the clamping position as shown in FIG. 8, the handheld collet assembly 200 is shown with the collet 100 and the handheld actuating assembly 150 coupled together and both in a retracted position. In the retracted position, the actuator head 182 protrudes from the handheld actuating assembly 150, as well as from the piston assembly 170, and is at least partially received within the actuator opening 132 defined by the mandrel 130, but the actuator head 182 does not move the mandrel 130 from the retracted position. The mandrel 130 is slidably movable within the collet interior 120 between the retracted position, as shown, and an extended position (FIG. 9) to selectively contact the interior ramp surfaces 122 of the fingers 104. In the retracted position, as shown, the mandrel 130 is not contacting or bearing against the interior ramp surfaces 122 of the fingers 104, so the fingers 104 remain in a first, clamped position corresponding to a non-deflected state or position of the fingers 104. The fingers 104 in the clamped position occupy the non-deflected state, which is a neutral state or unbiased state of the fingers 104. In the non-deflected state, the inherent resiliency of the fingers 104 causes the fingers 104 to return to or to remain in the neutral, non-deflected state wherein the fingers 104 are not deflected away from their unbiased, non-deflected state.

In the unclamped position as shown in FIG. 9, the handheld collet assembly 200 is shown with the collet 100 and the handheld actuating assembly 150 coupled together and both in the extended position. In the extended position, the actuating chamber 186 of the handheld actuating assembly 150 is expanded to move the actuating partition 184 further into the remaining interior 190 of the piston assembly 170. The actuating partition 184 in turn biases the actuator shaft 180 and the actuator head 182 into the extended position, protruding further from the piston assembly 170 than, in the retracted position. The actuator head 182 in the extended position bears against the actuator opening 132 of the mandrel 130, biasing the mandrel 130 to slidably move within the collet interior 120 from the retracted position (FIG. 8) to the extended position, as shown. The movement of the mandrel 130 from the retracted position to the extended position defines a stroke length of the mandrel 130. In the extended position, the mandrel 130 is moved to a maximum stroke of its stroke length within the collet interior 120, wherein a portion of the mandrel 130, such as the ramped surface, comes into contact with and bears against the interior ramp surfaces 122 of the fingers 104 as the mandrel 130 moves toward the maximum stroke in the extended position. When the mandrel 130 bears against the interior ramp surfaces 122 of the fingers 104 in the extended position, the fingers 104 are deflected to a second, unclamped position corresponding to a deflected state or position of the fingers 104. In one non-limiting example, the mandrel 130 can apply up to 14,000 pounds of force to bear against the interior ramp surfaces 122 of the fingers 104 as the mandrel 130 moves toward the maximum stroke in the extended position to deflect the fingers 104 to the second, unclamped position corresponding to the deflected state or position of the fingers 104.

When the fingers 104 occupy the non-deflected state of FIG. 8, the inherent resiliency of the fingers 104 maintains the fingers 104 in the clamped position wherein the clamped position of the fingers 104 prevents the workpiece 50 from being able to be inserted into and attached to the collet 100. Thus, in operation, in order to be able to attach the collet 100 to the workpiece 50, the fingers 104 are deflected to the unclamped position corresponding to the deflected state of the fingers 104 of FIG. 9. With the fingers 104 deflected to the unclamped position, the workpiece 50 is no longer prevented from being inserted into the collet 100, so the collet 100 can be mounted to the workpiece 50. Once the workpiece 50 is in place and mounted to the collet 100, the fingers 104 are released from the deflected state and permitted to return to their neutral, clamped position, wherein the inherent resiliency of the fingers 104 clamps the workpiece 50 within the collet 100 and clamps the clamping elements 140 to the workpiece 50.

Figure 10:
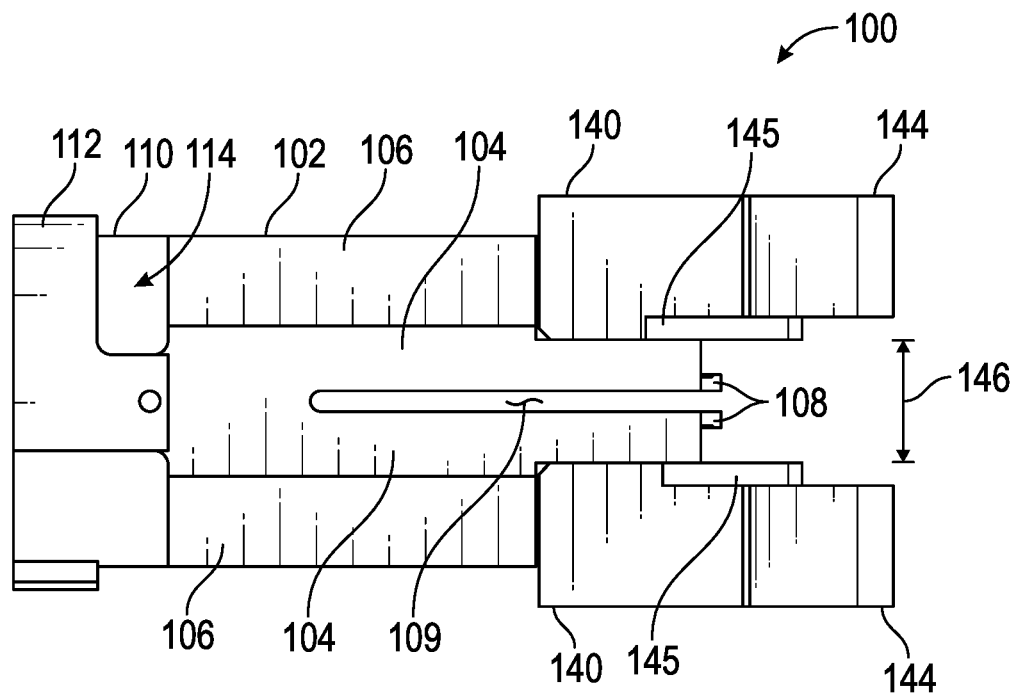
FIG. 10 is a top view of the collet of FIG. 6 with fingers of the collet shown in a clamping position corresponding to the retracted position of the mandrel.

Turning now to FIG. 10, a top view of the collet 100 shows the fingers 104 in the first, clamped position corresponding to the non-deflected state of the fingers and further corresponding to the retracted position of the handheld collet assembly 200 as shown in FIG. 8. In the non-deflected state, the gap 109 between the fingers 104 remains unchanged from the neutral state along the length of the fingers 104 to define a distance 146 between the clamp elements 140, such as between the angled portions 145. In one example, and as illustrated herein, the gap 109 between the fingers 104 has a constant width alone the full length of the fingers 104, the gap 109 remaining constant in width in the non-deflected state. However, it is also contemplated that the gap 109 between the fingers 104 in the non-deflected state can have a non-constant width.

Figure 11:
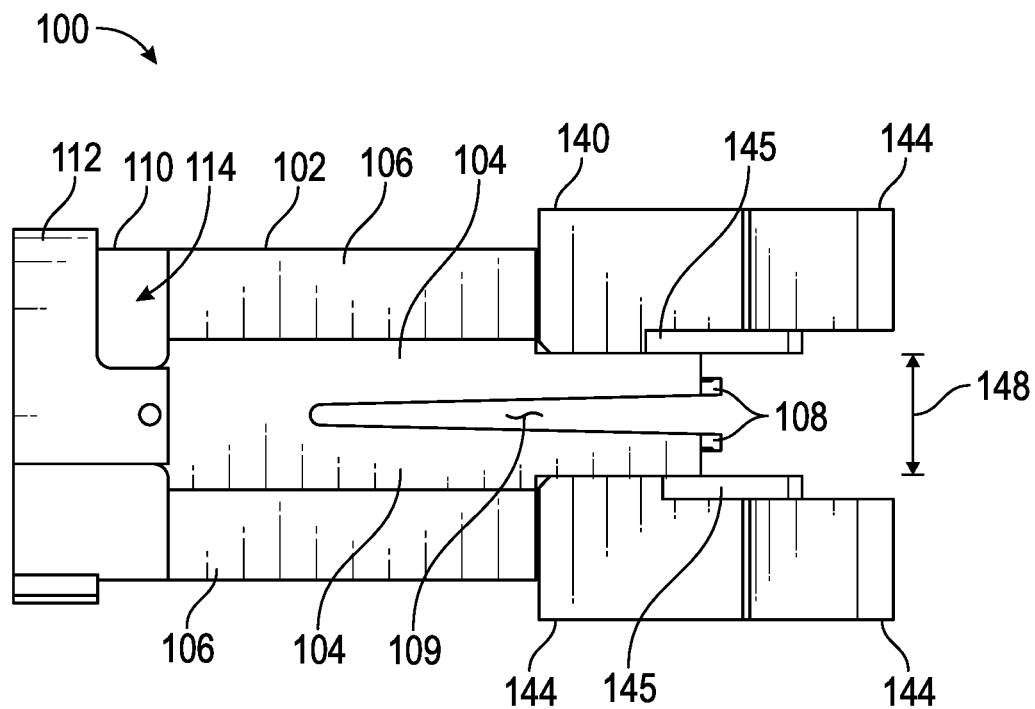
FIG. 11 is a top view of the collet of FIG. 10 with the fingers of the collet shown in a non-clamping position corresponding to the extended position of the mandrel.

Turning to FIG. 11, the top view of the collet 100 shows the fingers 104 in the second, unclamped position corresponding to the deflected state of the fingers 104 and further corresponding to the extended position of the handheld collet assembly 200 as shown in FIG. 9. In one example, and as illustrated herein, while the gap 109 between the fingers 104 has a constant width in the non-deflected state, instead, in the deflected state, the gap 109 between the fingers 104 increases in width moving along the length of the fingers 104 toward the clamp elements 140. Even in the case that the gap 109 between the fingers 104 has a non-constant width in the non-deflected state, in the deflected state, the width of the gap 109 is increased relative to the non-deflected state, regardless of whether the width of the gap 109 is constant or non-constant. As the fingers 104 are deflected outwardly, away from one another, the clamp elements 140 are also deflected outwardly, away from one another, to define a distance 148 between, the clamp elements 140, such as between the angled portions 145. Whether the gap 109 has a constant or a non-constant width in either of the deflected or the non-deflected states, the distance 148 between the clamp elements 140 and between the angled portions 145 in the deflected state is larger than the distance 146 between the clamp elements 140 and between the angled portions 145 in the non-deflected state of FIG. 10.

Because the clamp elements 140 are illustrated herein as single-piece clamp elements 140 that each fasten to two fingers 104, the fingers 104 are prevented from being deflected vertically away from one another. Thus, the deflection of the fingers 104 can only be seen in deflecting the fingers 104, and thus also the clamp elements 140, laterally outwardly away from one another, with vertical deflection of the fingers 104 being prevented. However, as described previously, if the clamp elements 140 were provided as separate clamp elements 140 such that each clamp element 140 coupled only to one finger 104, then deflection of the fingers 104 to the second, unclamped position corresponding to the deflected state of the fingers 104 would cause the fingers 104, and thus also the clamp elements 140, to be deflected both vertically and laterally outwardly away from one another.

Figure 12:
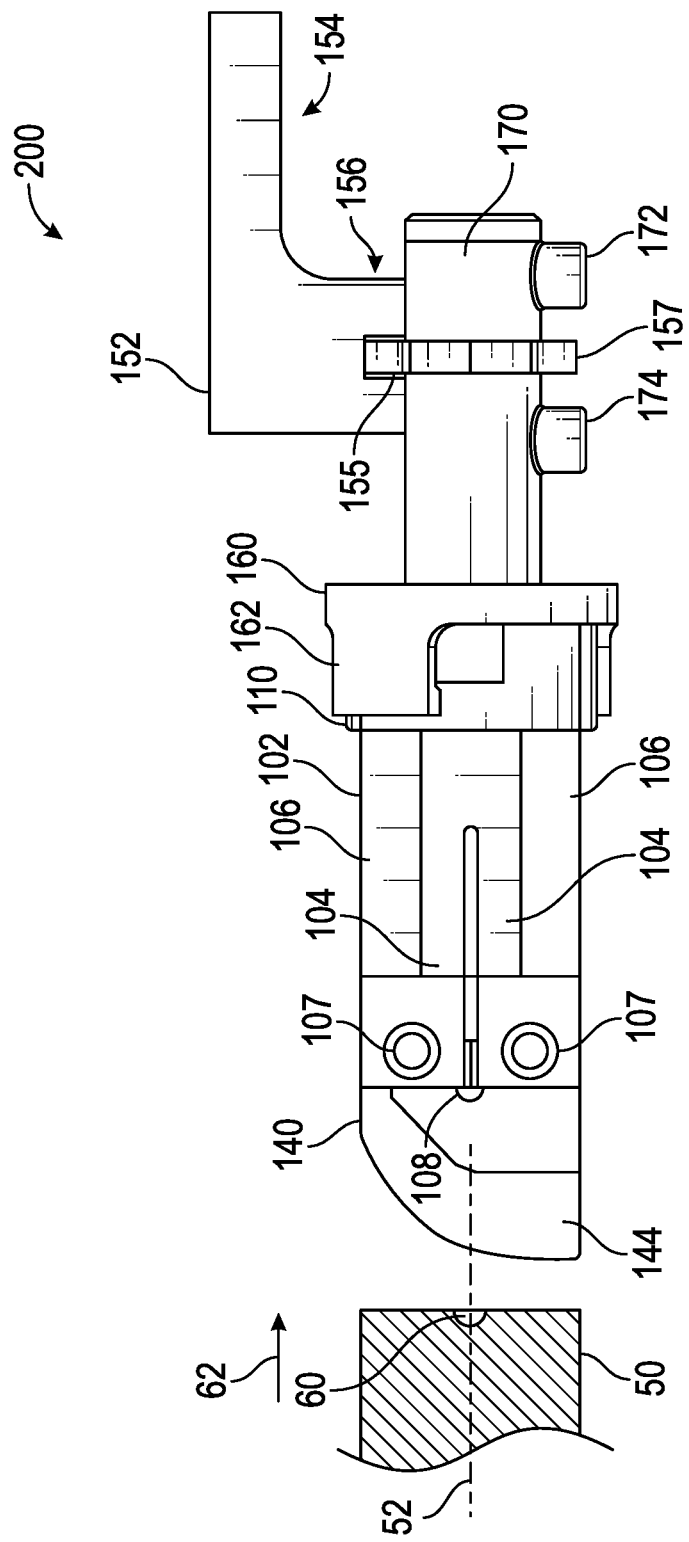
FIG. 12 is a side view of the handheld collet assembly of FIG. 2 with some of the clamp elements removed for clarity and a side cross-sectional view of a workpiece.
Figure 13:
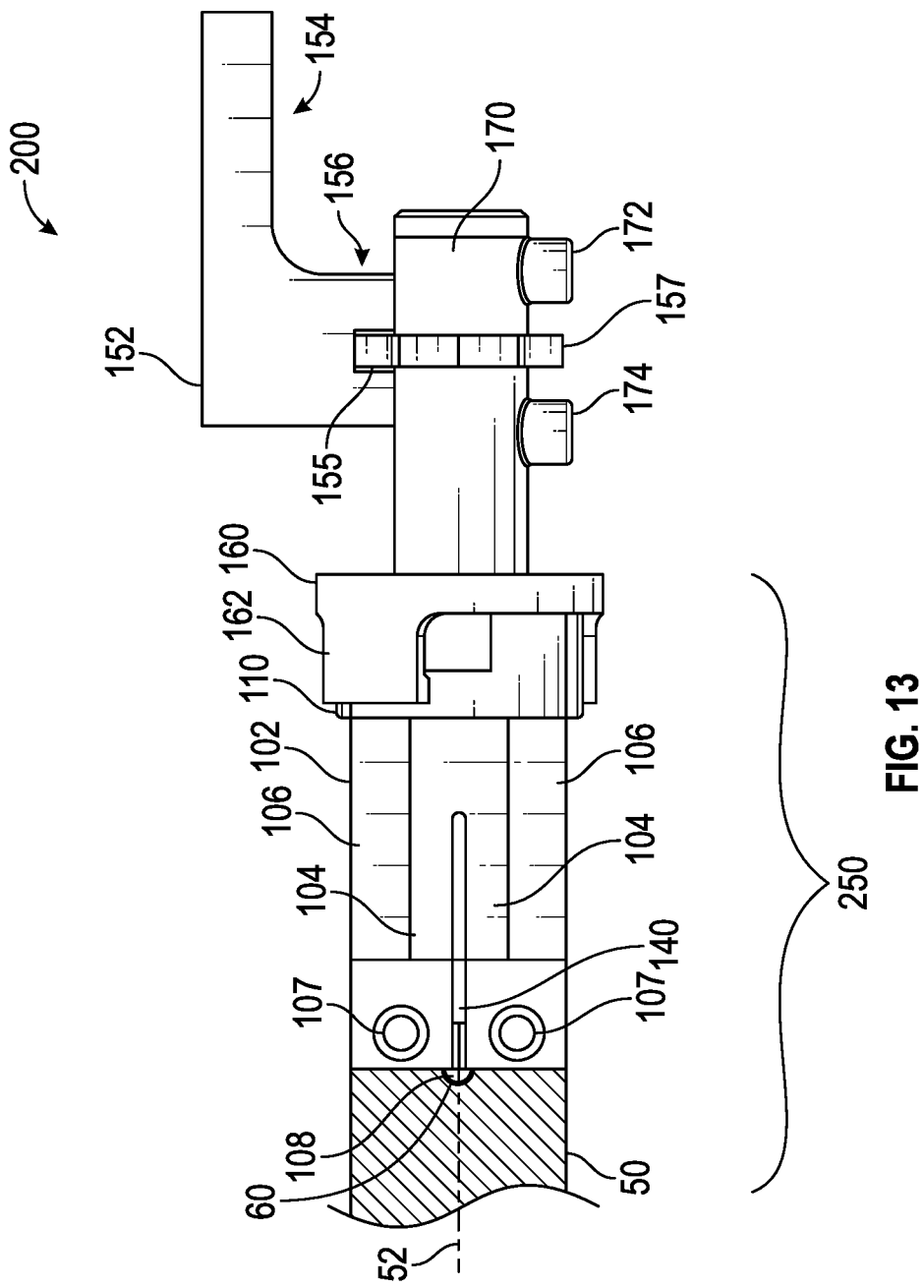
FIG. 13 is a side view of the handheld collet assembly of FIG. 12 with some of the clamp elements removed for clarity and a side cross-sectional view of the workpiece mounted to the handheld collet assembly, such that the collet and the workpiece collectively form a workpiece assembly for use with the milling machine of FIG. 1.
Figure 14:
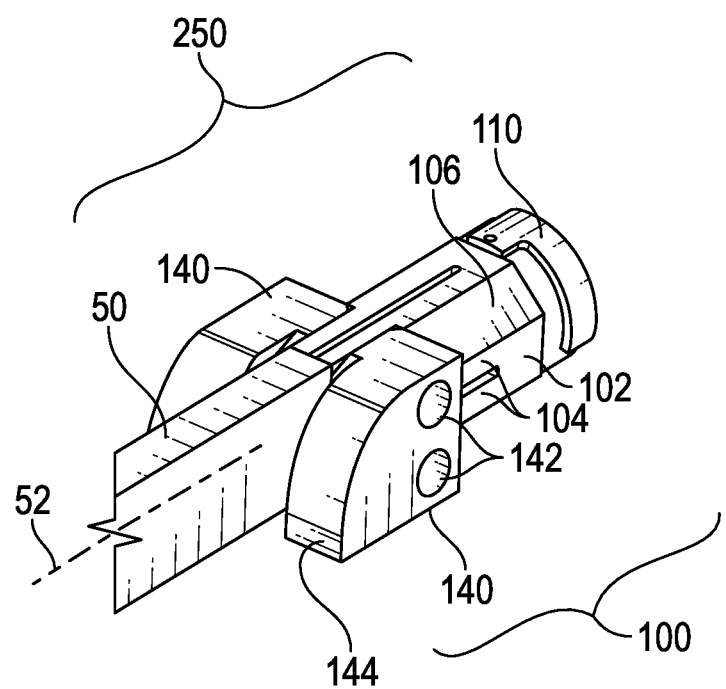
FIG. 14 is a perspective view of the workpiece assembly of FIG. 13 with the handheld actuating assembly removed.

The mounting of the workpiece 50 to the collet 100 within the handheld collet assembly 200 will be described with respect to FIGS. 12-14, which show the collet 100 in the clamping position (FIG. 12), the unclamped position (FIG. 13), and then returned to the clamping position with the workpiece 50 (FIG. 14). In the clamping position as shown in FIG. 12, the handheld collet assembly 200 is shown with the collet 100 and the handheld actuating assembly 150 coupled together and with one of the clamp elements 140 removed for clarity to show the optional projection 108 from the fingers 104. With the collet 100 and the handheld actuating assembly 150 in the retracted position and the fingers 104 correspondingly in the clamped position and the non-deflected state, the workpiece 50 is prevented from being received by the clamp elements 140 due to the distance 146 between the clamp elements 140 in the non-deflected state being too narrow to allow the workpiece 50 to be inserted between the clamp elements 140. Thus, the workpiece 50 is brought toward the handheld collet assembly 200 as shown by an arrow 62, but the workpiece 50 cannot yet be mounted within the collet 100 due to the fingers 104 and the clamp elements 140 occupying the non-deflected or unbiased state in the clamping position when no workpiece 50 is yet present within the collet 100.

Optionally, such as when the collet 100 includes the optional projection 108, the workpiece 50 further includes an index for relatively aligning the collet 100 with the workpiece 50. While any suitable index may be used, as illustrated, the workpiece 50 is shown in cross-section to show a keyway, illustrated herein in the form of a notch 60, that functions as the index. In one non-limiting example, the notch 60 protrudes inwardly into the workpiece 50, away from the handheld collet assembly 200 when the workpiece 50 is aligned with the handheld, collet assembly 200. The notch 60 is sized, positioned, and shaped to be complementary to the projection 108 such that the projection 108 can be received within the notch 60 when the collet 100 is mounted to the workpiece 50. In one non-limiting example, the projection 108, as well as the notch 60, can have a shape such as a cone shape to provide at least two axes of alignment between the workpiece 50 and the collet 100, though it will be understood that any suitable shape or size projection 108 and notch 60 can be provided.

Further, any suitable number of notches 60 can be provided in the workpiece 50, such as by being pre-formed in the workpiece 50, and specifically pre-formed in at least one end of the workpiece 50, so long as each projection 108 that is present on the collet 100 can be inserted and received within a notch 60. In addition, the notches 60 can have any suitable shape, size, or position that is complementary to the projections 108. By way of non-limiting example, the notches 60 can be provided as indentations, openings, holes, concave portions, channels, having tapered or non-tapered surfaces, or any other suitable structure for forming the keyway for the index. Further by way of non-limiting example, an exemplary key and keyway for the index are set forth in detail in U.S. Pat. No. 8,534,653, issued Sep. 17, 2013, and titled "Method and Fixture for Handling and Processing Die Components," which is incorporated herein by reference in its entirety.

Further yet, while the projections 108 are illustrated herein as being located on the fingers 104 of the collet 100 and the notches 60 are illustrated herein as being located on the workpiece 50, it will be understood that the structures could be switched, such that the projections 108 are provided on the workpiece 50 and the notches 60 are provided on the collet 100, so long as the key on one of the collet 100 or the workpiece 50 can be inserted into the corresponding keyway on the other of the collet 100 or the workpiece 50. Alternatively, or additionally, at least one key or keyway can be provided on the collet 100 at a location other than on the fingers 104, such as, for example, on the clamp elements 140. In one such example, either in addition to or in place of the projections 108 located on the fingers 104, at least one of the angled portions 145, or each of the angled portions 145, can include at least one projection 108 for cooperating with the at least one notch 60 of the workpiece 50. In this way, if a workpiece 50 has an angled end that would otherwise be unable to reach the projections 108 located on the fingers 104, the workpiece 50 can instead be at least, partially supported on the angled portions 145 such that the notches 60 of the angled end of the workpiece 50 at least partially receive the projections 108 located on the angled portions 145.

In the unclamped position as shown in FIG. 13, when the collet 100 and the handheld actuating assembly 150 are moved to the extended position and the fingers 104 are correspondingly in the unclamped position and the deflected state, the workpiece 50 is permitted to be received by the clamp elements 140 so that the workpiece 50 can be mounted to the collet 100. When the fingers 104 are in the deflected state, the distance 148 between the clamp elements 140 is sufficient for the workpiece 50 to be inserted between the clamp elements 140. Further, it follows that, in the extended position, when the mandrel 130 is at the maximum stroke, the clamp elements 140 are sufficiently spaced apart to permit the insertion or removal of the workpiece 50 from between the clamp elements 140. When the workpiece 50 is inserted between the clamp elements 140 and brought into contact with the collet 100, such that a portion of the workpiece 50 is received between the fingers 104 that comprise the clamp elements 140 in the case that the optional projections 108 are included with the collet 100, the projections 108 are inserted into and received within the notches 60 to ensure proper alignment and indexing of the collet 100 relative to the workpiece 50 when the collet 100 is mounted to the workpiece 50. Specifically, the indexing that is achieved by the cooperation of the projections 108 and the notches 60 serves to align the rotational axis 52 of the workpiece 50 with that of the collet 100, such that both the collet 100 and the workpiece 50 share the same aligned rotational axis 52.

In returning to the clamped position as shown in FIG. 14, once the collet 100 is properly mounted to the workpiece 50 and aligned and indexed, the collet 100 and the handheld actuating assembly 150 can be returned to the retracted position, moving the fingers 104 from the deflected state of the unclamped position to the non-deflected state of the clamped position to clamp a portion of the workpiece 50 between the fingers 104 and the clamp elements 140. The workpiece 50 is clamped between the fingers 104 by an inward clamping force that is applied by the fingers 104 due to the inherent resiliency of the fingers 104 that biases the fingers 104 toward the non-deflected state, thus clamping the workpiece 50 between the clamp elements 140. In this way, the fingers 104 can be thought of as collectively forming a clamp assembly for the collet 100. With the collet 100 mounted to the workpiece 50, the collet 100 and the workpiece 50 can be thought of as collectively forming a workpiece assembly 250 for use with the milling machine 10. Further, once the collet 100 is thus mounted to the workpiece 50, the handheld actuating assembly 150 can then be removed from the collet 100 to allow for the collet 100, and further the workpiece assembly 250, to be mounted to the chuck 40.

Figure 15:
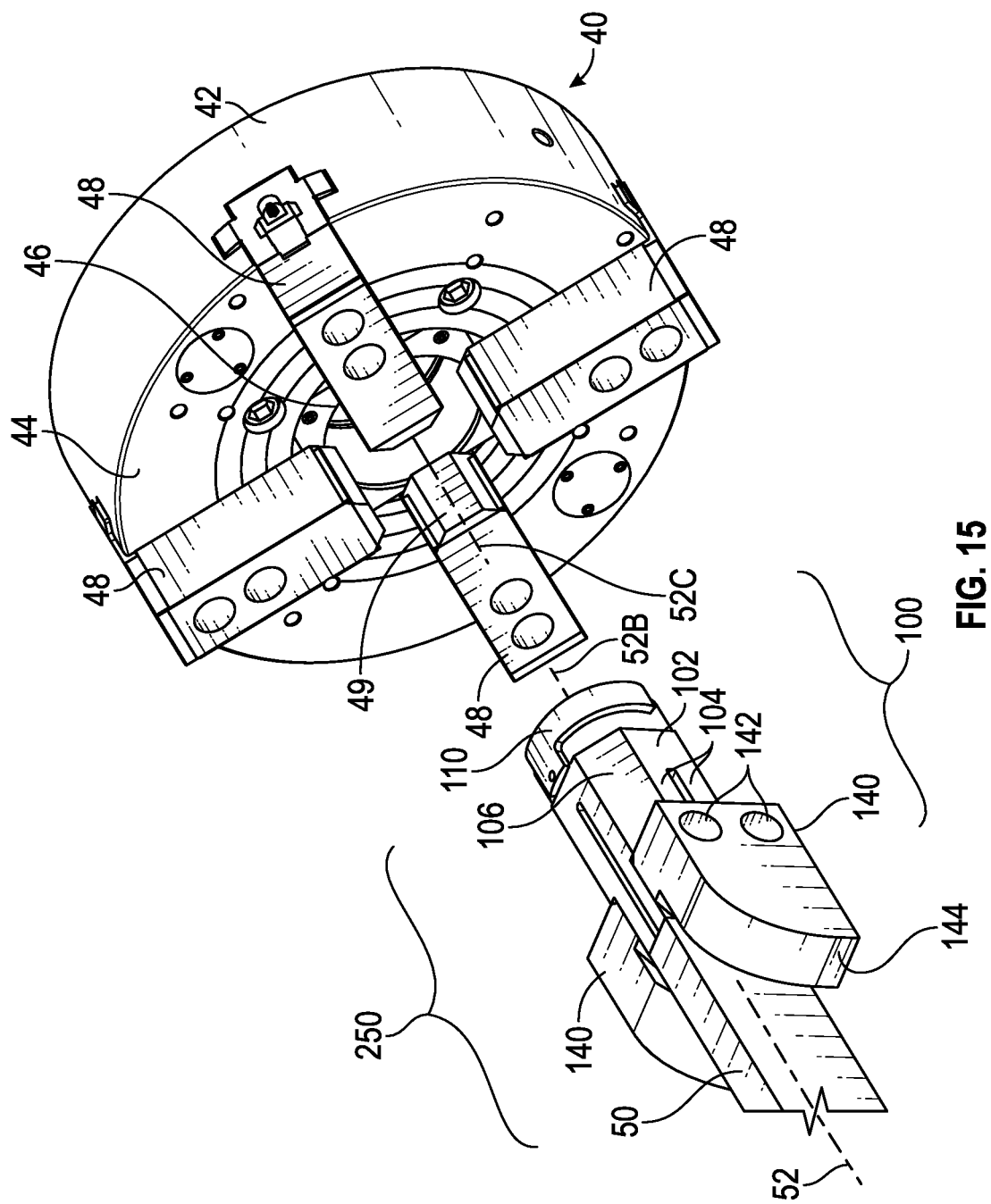
FIG. 15 is a perspective view of the workpiece assembly of FIG. 14 with the workpiece assembly aligned with the chuck of FIG. 1.

The mounting of the workpiece assembly 250 to the chuck 40 will be described with respect to FIGS. 15-17. Turning now to FIG. 15, the workpiece assembly 250 can be prepared for mounting to the chuck 40. The handheld actuating assembly 150 is removed from the collet 100 prior to mounting the collet 100, and also the workpiece assembly 250, to the chuck 40, such as prior to receipt of the collet 100 within the chuck 40. Within the workpiece assembly 250, the first axis of rotation 52 of the workpiece 50 and a second, axis of rotation 52B of the collet 100 are co-axially aligned with one another, such as optionally due to the cooperation between the projection 108 and the notch 60 acting as an index between the collet 100 and the workpiece 50. In order to mount the collet 100, and therefore the workpiece assembly 250, to the chuck 40, the rotational axis 52 of the workpiece assembly 250 is co-axially aligned with a third axis of rotation 52C of the chuck 40 in order to insert at least a portion of the collet 100, specifically the first coupling 110, which can act as the chuck mount, into the chuck opening 46 of the chuck 40. Upon insertion of the first coupling 110 serving as the chuck mount to be received within the chuck 40, the rotational axes of the workpiece 50, the collet 100, and the chuck 40 will be co-axially aligned when the workpiece assembly 250 is mounted to the chuck 40. For example, the clamping jaws 48 of the chuck 40 each include a flat inward-facing surface 49 configured to align and cooperate with the flats 106 of the fingers 104 to ensure co-axial alignment of the workpiece assembly 250 and the chuck 40.

Figure 16:
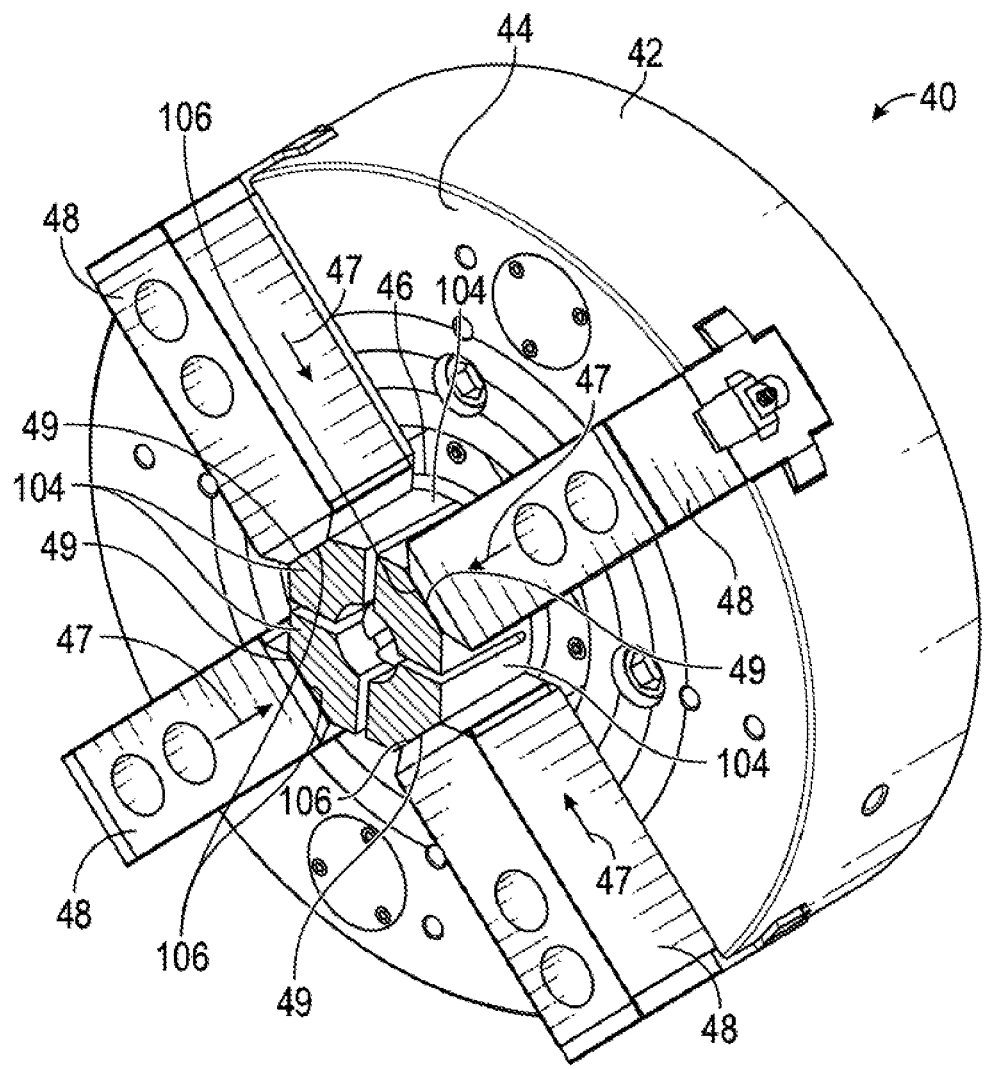
FIG. 16 is a perspective front cross-sectional view of the workpiece assembly received within the chuck of FIG. 15, with a portion of the collet and the workpiece removed.

The clamping of the clamping jaws 48 of the chuck 40 against the flats 106 of the fingers 104 are best seen in FIG. 16. In FIG. 16, a cross-sectional view shows the collet 100 received within the chuck 40 and the clamping jaws 48, with the workpiece 50 and a portion of the collet 100 removed in the cross-section. Inserting the collet 100 into the chuck 40 comprises aligning, such as radial aligning or alignment, of at least some of the fingers 104, and specifically the flats 106, with at least some of the clamping jaws 48, and specifically the flat inward-facing surfaces 49. Further, in addition to being aligned with one another, the clamping jaws 48 can directly contact the fingers 104. Specifically, the at least some of the flat inward-facing surfaces 49 of the clamping jaws 48 can directly contact at least some of the flats 106 of the fingers 104. Further yet, the clamping jaws 48 can be brought to bear against the fingers 104 in the direction of the arrows 47 in order to apply a clamping force from the clamping jaws 48 to the fingers 104 to further increase the clamping force already applied by the fingers 104 to the workpiece 50.

In one example, the clamping force applied to the workpiece 50 by the collet 100 when the collet 100 is mounted to the workpiece 50, due to the inherent resiliency of the fingers 104 of the collet 100, is more than sufficient for the collet 100 to remain securely mounted to and properly aligned with the workpiece 50 within the workpiece assembly 250, even as the workpiece assembly 250 is moved about, such as during assembly of the workpiece assembly 250 or in transporting the workpiece assembly 250 to the milling machine 10 or in alignment and mounting of the workpiece assembly 250 to the chuck 40. However, the forces that can be applied to the workpiece 50 during the process of machining within the milling machine 10 can be significant, and thus the clamping force applied to the workpiece 50 by the collet 100 may not be sufficient as the sole source of clamping force retaining the workpiece 50 during machining operations. Therefore, mounting the collet 100 within the chuck 40 and applying additional clamping force from the clamping jaws 48 to the collet 100 can supplement the clamping force applied by the collet 100 alone, ensuring that the workpiece 50 is securely retained and in proper alignment within the collet 100 and also within the chuck 40 throughout machining operations. By way of non-limiting example, the clamping force applied to the workpiece 50 by the collet 100 and the fingers 104 alone can be up to 3,500 pounds, optionally more specifically up to 3,000 pounds, optionally more specifically yet in the range of 1,000 pounds to 3,000 pounds, while the clamping force applied to the collet 100, and thus also to the workpiece 50, by the clamping jaws 48 of the chuck 40 can be at least 5,000 pounds, optionally more specifically at least 10,000 pounds, optionally more specifically yet at least 14,000 pounds.

Figure 17:
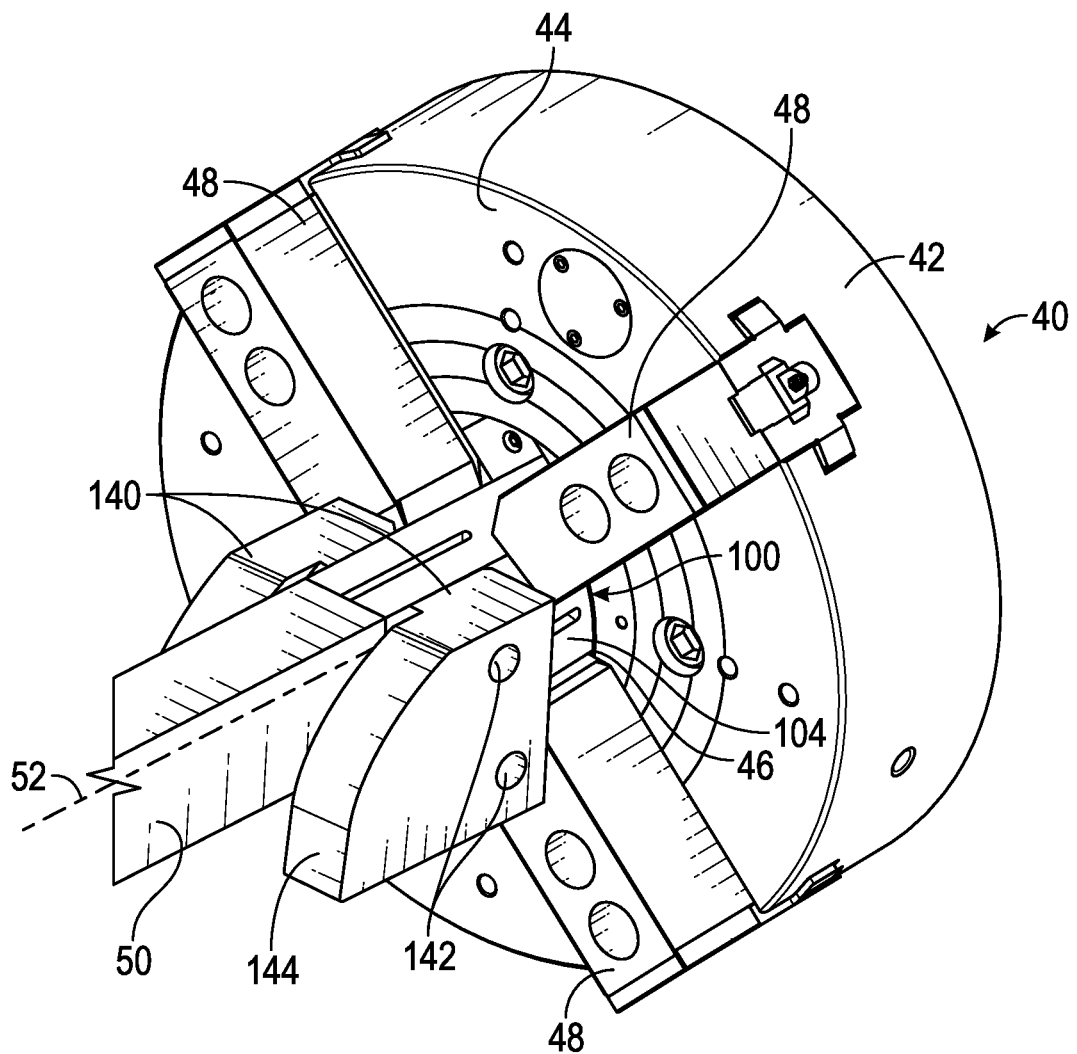
FIG. 17 is a perspective view of the workpiece assembly received within the chuck of FIG. 16.

The fully assembled workpiece assembly 250 mounted within the chuck 40 is best seen in FIG. 17. In one non-limiting example, the workpiece assembly 250 can be mounted to the chuck 40 such that the chuck 40, the collet 100, and the workpiece 50 share the common, co-axial rotational axis 52, and the workpiece 50 is clamped within the collet 100 by the clamping force of the fingers 104, and is further clamped by the clamping force applied to the fingers 104 by the chuck 40, and specifically by the clamping jaws 48. However, it will be understood that the chuck 40, the collet 100, and the workpiece 50 need not share the common, co-axial rotational axis 52 in all cases. For example, in some cases, the workpiece 50 could have a longitudinal body axis that is not, aligned with the rotational axis 52 of the chuck 40 and of the collet 100.

Figure 18:
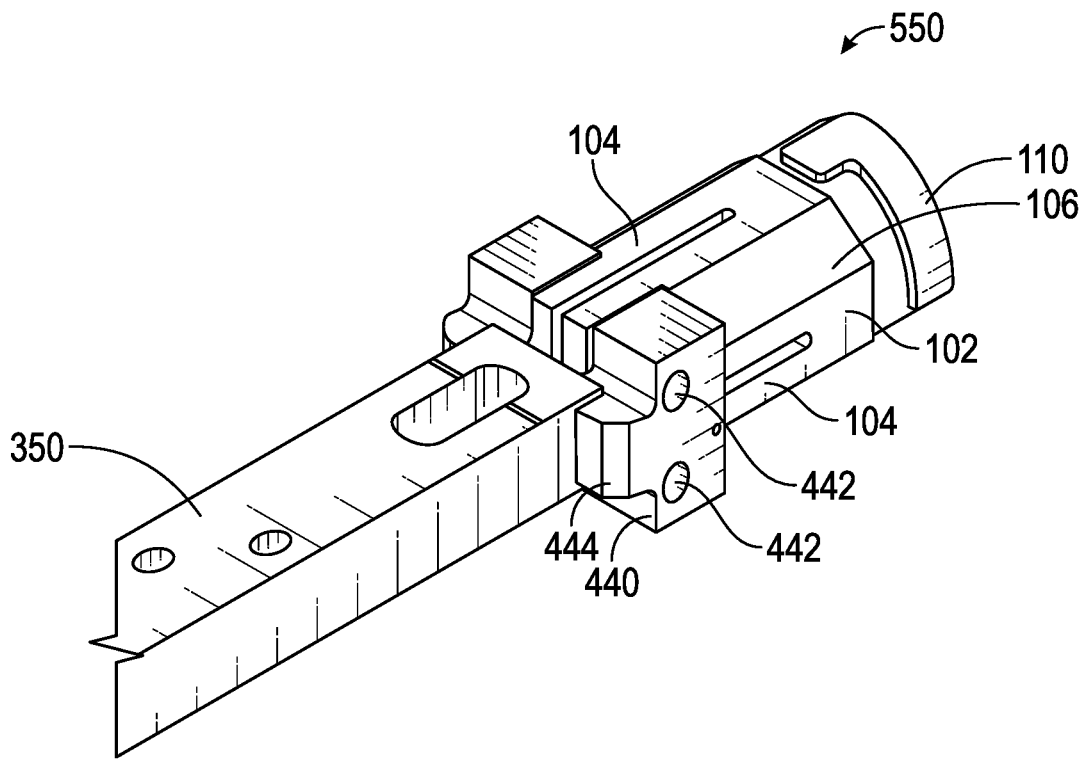
FIG. 18 is a perspective view of another example of a clamp element and a workpiece for use with the collet of FIG. 5 to form another example of a workpiece assembly for use with the milling machine of FIG. 1.
Figure 19:
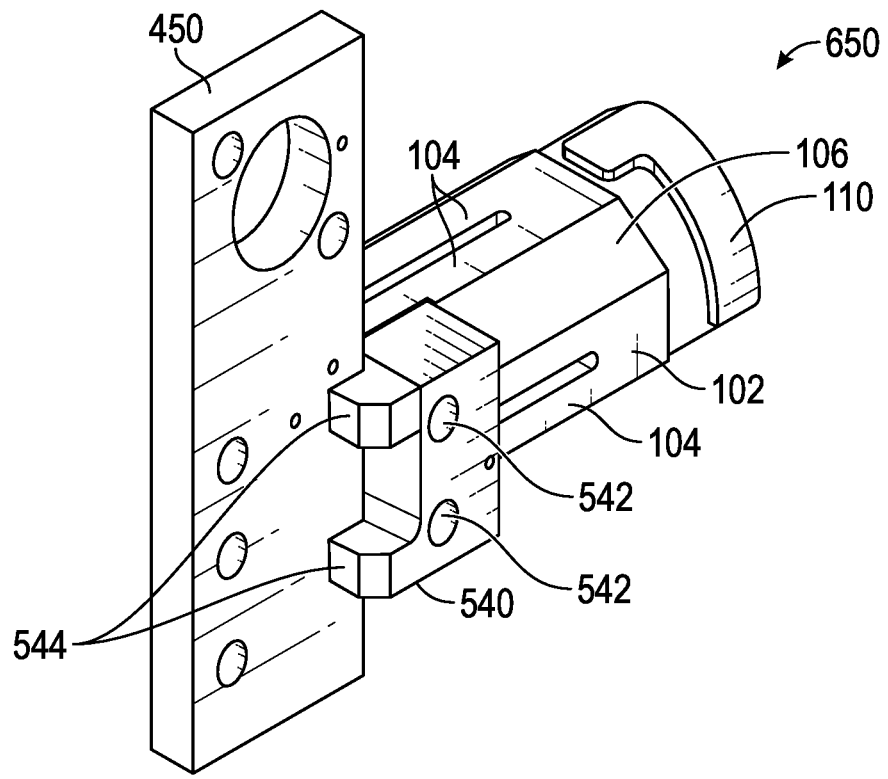
FIG. 19 is a perspective view of another example of a clamp element and a workpiece for use with the collet of FIG. 5 to form another example of a workpiece assembly for use with the milling machine of FIG. 1.
Figure 20:
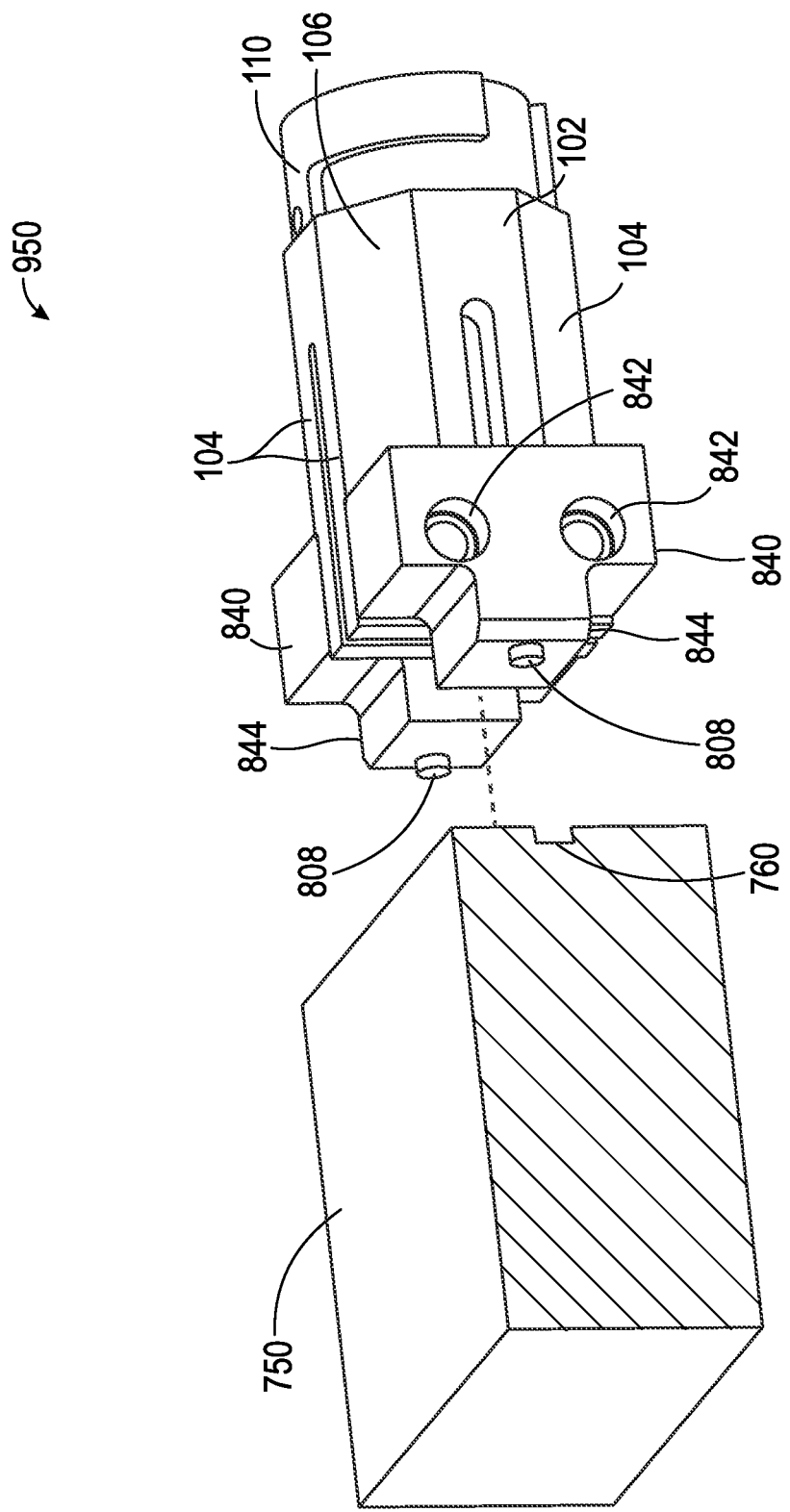
FIG. 20 is a perspective view of another example of a clamp element and a workpiece for use with the collet of FIG. 5 to form another example of a workpiece assembly for use with the milling machine of FIG. 1.

Alternate examples of clamp elements 140 and workpieces 50 for use with the collet 100 will be described with respect to FIG. 18, FIG. 19, and FIG. 20. The collet 100 and fingers 104 as described herein can be customizable for use with a variety of different clamp elements 140 and workpieces 50. Thus, FIG. 18 illustrates another example of clamp elements 440, a workpiece 350, and a workpiece assembly 550 for use with the collet 100 and handheld actuating assembly 150 within the milling machine 10 described herein that is similar to the clamp elements 140, workpiece 50, and workpiece assembly 250 of FIGS. 1-17, and shares many of the same features and components as the clamp elements 140, workpiece 50, and workpiece assembly 250, but differs in some aspects, such as in the shape of the clamp elements 440 and the workpiece 350. Therefore, elements of the clamp elements 440, the workpiece 350, and the workpiece assembly 550 that are similar to those of the clamp elements 140, the workpiece 50, and the workpiece assembly 250 are identified with numerals increased by 300, with it being understood that the description of the like parts of the clamp elements 140, workpiece 50, and workpiece assembly 250 apply to the clamp elements 440, workpiece 350, and workpiece assembly 550, unless otherwise noted.

The clamp elements 440 are similar to the clamp elements 140 in most aspects, but differ from the clamp elements 140 in the shape of the clamp tooling 444, as the shape of the workpiece 350 differs from the shape of the workpiece 50. The arrangement and description of fastener openings 442, and of the function of the clamp tooling 444, as well as of the attachment of the clamp elements 440 to the workpiece 350 to form the workpiece assembly 550 is still the same and can be operated in the same manner as in the clamp elements 140, Because milling machines 10 can be used for machining a variety of workpieces 50, 350 and products, it is desirable to have added flexibility within the milling machine 10 by having clamp elements 140,440 that are removable from the fingers 104 and can be changed out as desired to be customized for clamping and aligning the specific workpiece 50, 350 to be machined and to form the workpiece assembly 250, 550.

As previously described, the collet 100 and fingers 104 as described herein can be customizable for use with a variety of different clamp elements 140 and workpieces 50. Thus, FIG. 19 illustrates another example of clamp elements 540, a workpiece 450, and a workpiece assembly 650 for use with the collet 100 and handheld actuating assembly 150 within the milling machine 10 described herein that is similar to the clamp elements 140, workpiece 50, and workpiece assembly 250 of FIGS. 1-17, and shares many of the same features and components as the clamp elements 140, workpiece 50, and workpiece assembly 250, but differs in some aspects, such as in the shape of the clamp elements 540 and the workpiece 450. Therefore, elements of the clamp elements 540, the workpiece 450, and the workpiece assembly 650 that are similar to those of the clamp elements 140, the workpiece 50, and the workpiece assembly 250 are identified with numerals increased by 400, with it being understood that the description of the like parts of the clamp elements 140, workpiece 50, and workpiece assembly 250 apply to the clamp elements 540, workpiece 450, and workpiece assembly 650, unless otherwise noted.

The clamp elements 540 are similar to the clamp elements 140 in most aspects, but differ from the clamp elements 140 in the shape of the clamp tooling 544, as the shape of the workpiece 450 differs from the shape of the workpiece 50. The arrangement and description of fastener openings 542, and of the function of the clamp tooling 544, as well as of the attachment of the clamp elements 540 to the workpiece 450 to form the workpiece assembly 650 is still the same and can be operated in the same manner as in the clamp elements 140. Because milling machines 10 can be used for machining a variety of workpieces 50, 350, 450 and products, it is desirable to have added flexibility within the milling machine 10 by having clamp elements 140, 440, 540 that are removable from the fingers 104 and can be changed out as desired to be customized for clamping and aligning the specific workpiece 50, 350, 450 to be machined and to form the workpiece assembly 250, 550, 650.

As previously described, the collet 100 and fingers 104 as described herein can be customizable for use with a variety of different clamp elements 140 and workpieces 50. Thus, FIG. 20 illustrates another example of clamp elements 840, a workpiece 750, and a workpiece assembly 950 for use with the collet 100 and handheld actuating assembly 150 within the milling machine 10 described herein that is similar to the clamp elements 140, workpiece 50, and workpiece assembly 250 of FIGS. 1-17, and shares many of the same features and components as the clamp elements 140, workpiece 50, and workpiece assembly 250, but differs in some aspects, such as in the shape of the clamp elements 840 and the workpiece 750. Therefore, elements of the clamp elements 840, the workpiece 750, and the workpiece assembly 950 that are similar to those of the clamp elements 140, the workpiece 50, and the workpiece assembly 250 are identified with numerals increased by 700, with it being understood that the description of the like parts of the clamp elements 140, workpiece 50, and workpiece assembly 250 apply to the clamp elements 840, workpiece 750, and workpiece assembly 950, unless otherwise noted.

The clamp elements 840 are similar to the clamp elements 140 in most aspects, but differ from the clamp elements 140 in the shape of the clamp tooling 844, as the shape of the workpiece 750 differs from the shape of the workpiece 50, and also in the function of the clamp tooling 844, specifically in how the workpiece 750 attaches with the clamp elements 840 and the clamp tooling 844 to form the workpiece assembly 950. The arrangement and description of fastener openings 842 for coupling the clamp elements 840 to the fingers 104 is still the same and can be operated in the same manner as in the clamp elements 140. In the workpiece assembly 250, the workpiece 50 is at least partially received between the clamp elements 140, and specifically between the clamp toolings 144, to attach with the collet 100 to form the workpiece assembly 250, and can index with the optional projections 108, when included, that are also positioned between the clamp elements 140, such as on the fingers 104 or on the angled portions 145 of the clamp elements 140. However, while the clamp elements 840 do include the clamp toolings 844 that are spaced apart from one another when the clamp elements 840 are coupled to the fingers 104, the clamp elements 840 further include projections 808 that, instead of being positioned between the spaced apart clamp elements 840, are instead located on the front surface of the clamp toolings 844, projecting from the clamp toolings 844 toward the workpiece 750. The workpiece 750 includes at least one notch 760, each notch 760 positioned so as to be complementary with the corresponding projection 808. When the workpiece 750 and the clamp elements 840 are attached to form the workpiece assembly 950, each projection 808 is received within a notch 760 of the workpiece 750. However, instead of the workpiece 750 extending between the clamp toolings 844, the workpiece 750 instead abuts the clamp toolings 844 such that the interaction between the notches 760 and the projections 808 attaches the workpiece 750 with the clamp elements 840 without the workpiece 750 extending in between the clamp elements 840 or the clamp toolings 844. While the clamp elements 840 are illustrated herein as each including one projection 808, it will be understood that each of the clamp elements 840 can include more than one projection 808.

Because milling machines 10 can be used for machining a variety of workpieces 50, 350, 450, 750 and products, it is desirable to have added flexibility within the milling machine 10 by having clamp elements 140, 440, 540, 840 that are removable from the fingers 104 and can be changed out as desired to be customized for clamping and aligning the specific workpiece 50, 350, 450, 750 to be machined and to form the workpiece assembly 250, 550, 650, 950.

Figure 21:
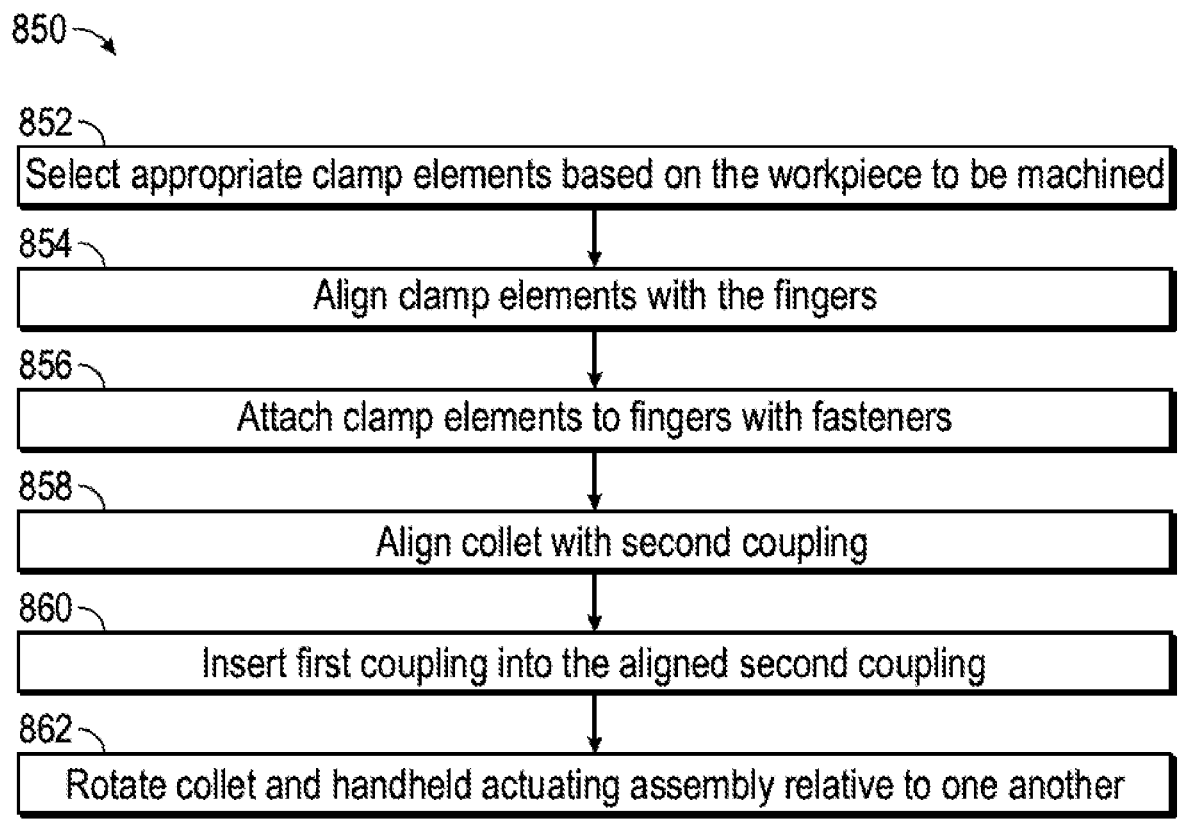
FIG. 21 is a flow chart illustrating a method of assembling the collet and the removable handheld actuating assembly to form the handheld collet assembly of FIG. 2.

The method and operation of mounting the workpiece 50, 350, 450, 750 to the milling machine 10 will be described with respect to FIGS. 21-23. FIG. 21 illustrates a method 850 for assembling the collet 100 with the handheld actuating assembly 150 to form the handheld collet assembly 200. First, at step 852, the appropriate clamp elements 140, 440, 540, 840 are selected based on the workpiece 50, 350, 450, 750 to be machined. At step 854, the clamp elements 140, 440, 540, 840 are aligned with the fingers 104 such that the fastener openings 142, 442, 542, 842 are aligned with the fastener bosses 107. At step 856, the clamp elements 140, 440, 540, 840 are attached to the fingers 104 with fasteners. At step 858, the collet 100 is aligned with the second coupling 160 of the handheld actuating assembly 150. Specifically, the first coupling 110 of the collet 100 is aligned with the second coupling 160 such that the tabs 162 are lined up between the ribs 112 of the first coupling 110. At step 860, the first coupling 110 of the collet 100 is inserted into the second coupling 160 in the previously described alignment of step 858. At step 862, the collet 100 and the handheld actuating assembly 150 are rotated relative to one another such that the ribs 112 of the first coupling 110 are received within the channels 166, and the lugs 164 of the second coupling 160 are received within the channels 114 of the first coupling 110 to form a bayonet-style attachment between the collet 100 and the handheld actuating assembly 150 to form the handheld collet assembly 200.

Figure 22:
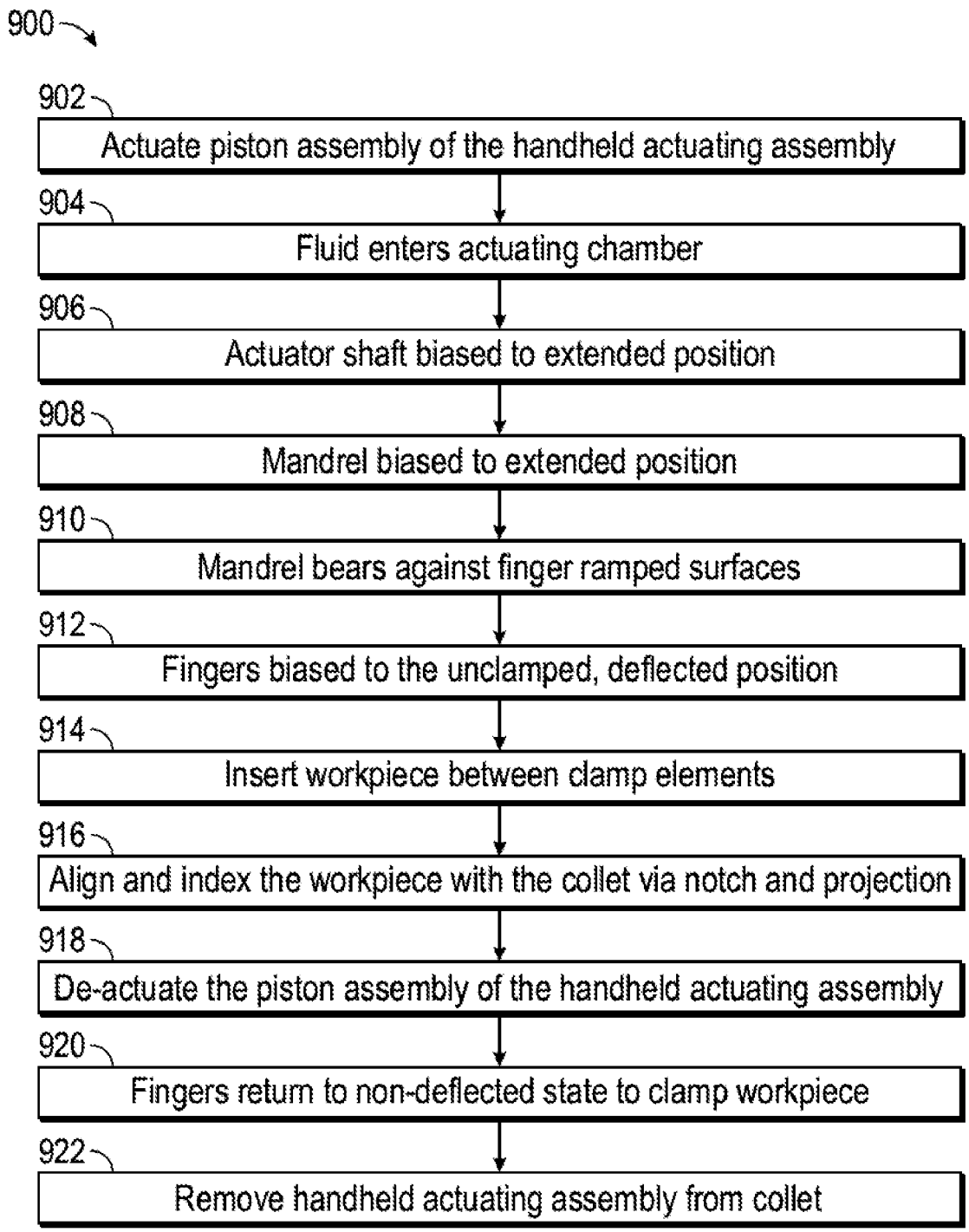
FIG. 22 is a flow chart illustrating a method of mounting the workpiece to the collet to form the workpiece assembly of FIG. 13.

FIG. 22 illustrates a method 900 for mounting the collet 100 to the workpiece 50, 350, 450, 750 to form the workpiece assembly 250, 550, 650, 950. Because the handheld actuating assembly 150, the collet 100, and also the handheld collet assembly 200 are handheld relative to the milling machine 10, the handheld collet assembly 200 can be used to mount the collet 100 to the workpiece 50, 350, 450, 750 at a suitable convenient location, rather than having to be done within the confines of the milling machine 10. When the handheld collet assembly 200 is in place adjacent the workpiece 50, 350, 450, 750, the handheld actuating assembly 150, and specifically the piston assembly 170, is actuated at step 902. Upon actuation of the piston assembly 170, at step 904, fluid enters the actuating chamber 186 through the first fluid flow coupling 172. At step 906, the fluid entering the actuating chamber 186 biases the actuating partition 184 against the actuator shaft 180, expanding the actuating chamber 186 to drive the actuator shaft 180 and the actuator head 182 outwardly from the interior 190 and from the retracted position to the extended position. At step 908, the actuator head 182 bears against the actuator opening 132 of the mandrel 130 within the collet interior 120 to move the mandrel 130 from the retracted position to the extended position and towards the maximum stroke length of the mandrel 130. At step 910, the mandrel 130, such as the ramped surface of the mandrel 130, bears against the interior ramp surfaces 122 of the fingers 104 within the collet interior 120. At step 912, the bearing of the mandrel 130 against the interior ramp surfaces 122 of the fingers 104 biases the fingers 104 from the clamped position and the non-deflected state to the unclamped position and the deflected state.

At step 914, with the fingers 104 in the deflected state where they are biased toward the unclamped, deflected position, the clamp elements 140, 440, 540, 840 are separated enough that the workpiece 50, 350, 450, 750 can be inserted between the clamp elements 140, 440, 540, 840. Once within the clamp elements 140, 440, 540, 840, at optional step 916, the notch 60, 760 of the workpieces 50, 350, 450, 750 is optionally aligned with the projection 108 of the collet 100, or with the projections 808 of the clamp elements 840, to properly index and align the workpiece 50, 350, 450, 750 with the collet 100. When the workpiece 50, 350, 450, 750 is properly aligned and indexed, the handheld actuating assembly 150, specifically the piston assembly 170 can be de-actuated at step 918. At step 920, the collet 100 and the handheld actuating assembly 150 return from the extended position to the retracted position, removing the biasing force from the fingers 104 and allowing the fingers 104 to return to the non-deflected state and the clamped, unbiased position to clamp inwardly against the workpiece 50, 350, 450, 750 to retain the workpiece 50, 350, 450, 750 within the collet 100 to form the workpiece assembly 250, 550, 650,950. At step 922, the handheld actuating assembly 150 is removed from the collet 100, and thus also from the workpiece assembly 250, 550, 650, 950, by twisting the collet 100 and the handheld actuating assembly 150 relative to one another to remove the bayonet coupling of the second coupling 160 to the first coupling 110. With the handheld actuating assembly 150 removed, the workpiece assembly 250, 550, 650, 950 is formed and constitutes a handheld workpiece assembly 250, 550, 650, 950 relative to the milling machine 10 that can subsequently be mounted to the chuck 40.

Figure 23:
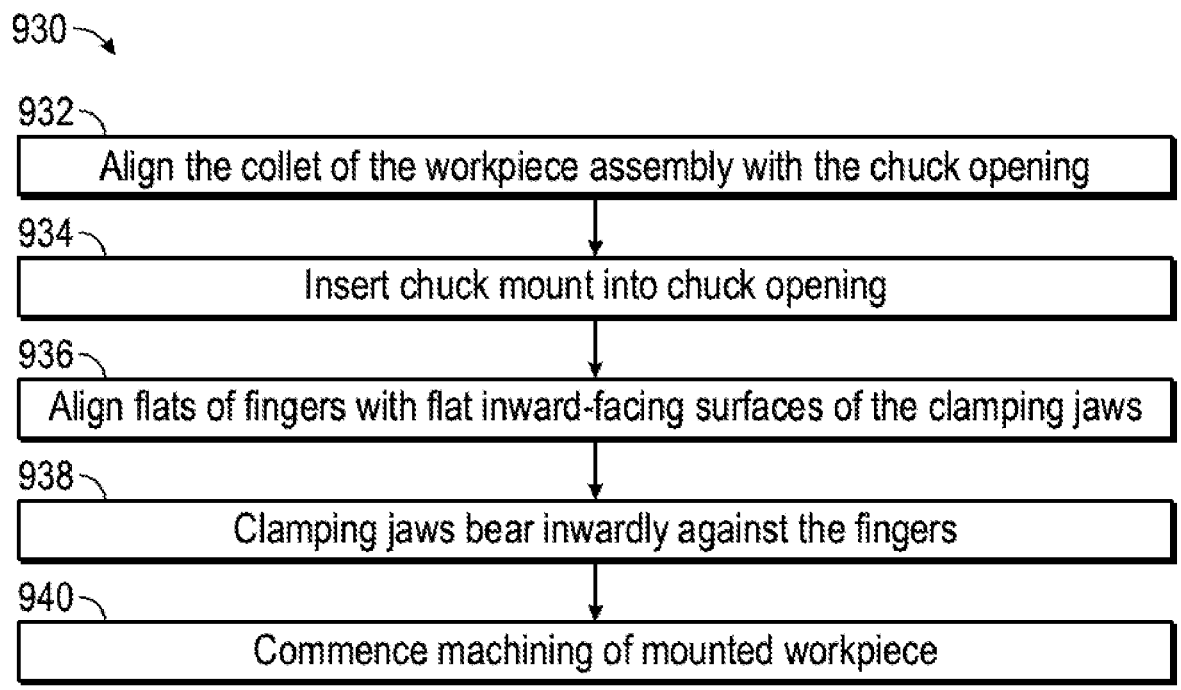
FIG. 23 is a flow chart illustrating a method of mounting the workpiece assembly to the chuck of FIG. 17 for use with the milling machine of FIG. 1.

FIG. 23 illustrates a method 930 for mounting the collet 100, and thus also the workpiece assembly 250, 550, 650, 950, to the chuck 40. At step 932, the collet 100 of the workpiece assembly 250, 550, 650, 950 is aligned with the chuck opening 46 between the clamping jaws 48. At step 934, the chuck mount portion of the first coupling 110 of the collet 100 is inserted into the chuck opening 46. During insertion of the collet 100 into the chuck 40, at step 936, the flats 106 of the fingers 104 will be aligned with and contacting the flat inward-facing surfaces 49 of the clamping jaws 48. At step 938, the clamping jaws 48 are brought to bear inwardly against the fingers 104 to further clamp the workpiece 50, 350, 450, 750 within the collet 100. At step 940, the workpiece 50, 350, 450, 750 is properly secured, aligned, and indexed with the collet 100 and with the chuck 40, and machining of the workpiece 50, 350, 450,750 by the cutting tool 20 can commence.

Figure 24:
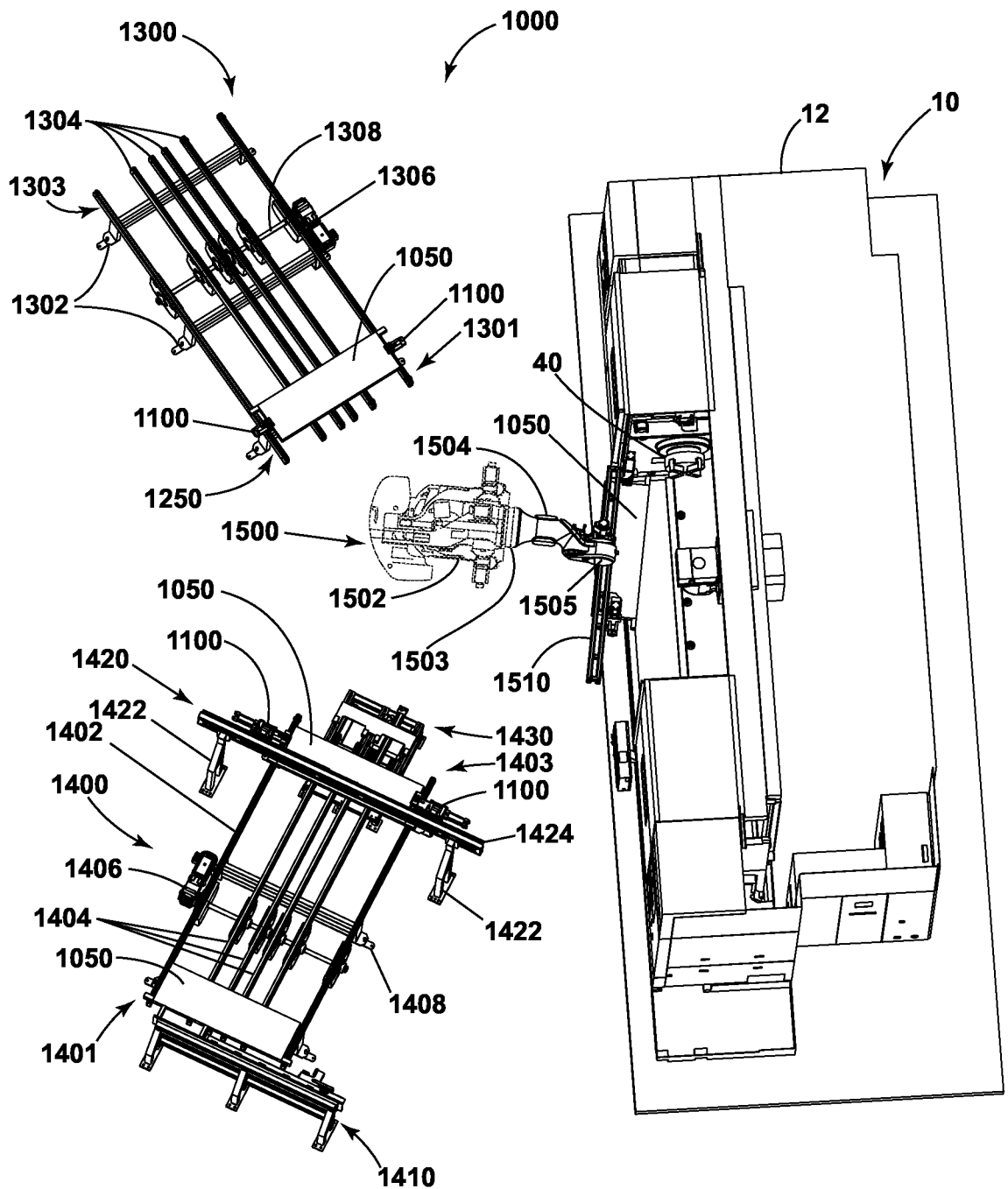
FIG. 24 is a top perspective view of an automatic loading assembly for use with the milling machine and the chuck of FIG. 1 and including a first conveyor assembly, a second conveyor assembly, and a robotic assembly.

An example of an optional automatic loading assembly 1000 for use with the milling machine 10 and the chuck 40 will be described with respect to FIGS. 24-30. The collet 100 and workpiece 50 of the present disclosure can be used in the context of the handheld actuating assembly 150 as previously described, or, alternatively or additionally, can be configured for use with a variety of automation assemblies and methods. Thus, FIG. 24 illustrates one non-limiting exemplary configuration for the automatic loading assembly 1000 that can optionally be used with the milling machine 10 and the chuck 40, as well as with another example of a workpiece 1050, a collet 1100, and a workpiece assembly 1250 for use with the chuck 40 within the milling machine 10 as previously described. The workpiece 1050, the collet 1100, and the workpiece assembly 1250 are similar to the workpiece 50, the collet 100, and the workpiece assembly 250 of FIGS. 1-17, and shares many of the same features and components as the workpiece 50, collet 100, and workpiece assembly 250, but differs in some aspects, such as in the shape of the workpiece 1050 and the collet 1100. Therefore, elements of the workpiece 1050, the collet 1100, and the workpiece assembly 1250 that are similar to those of the workpiece 50, the collet 100, and the workpiece assembly 250 are identified with numerals increased by 1000, with it being understood that the description of the like parts of the workpiece 50, collet 100, and workpiece assembly 250 apply to the workpiece 1050, the collet 1100, and the workpiece assembly 1250, unless otherwise noted.

The automatic loading assembly 1000 is adapted to at least partially automate and assist with the processes of attaching and removing the collet 1100 to and from the workpiece 1050 to assemble and disassemble the workpiece assembly 1250, as well as loading and removal of the workpiece assembly 1250 to and from the milling machine 10. Specifically, the automatic loading assembly 1000 comprises a first conveyor assembly, illustrated as an outfeed conveyor assembly 1300 adapted for receiving and/or supporting a machined workpiece assembly 1250 that can be placed upon the outfeed conveyor assembly 1300 after being removed from the milling machine 10, a second conveyor assembly, illustrated as an infeed conveyor assembly 1400 for delivering the workpiece 1050 for attachment of the collet 1100 to form the workpiece assembly 1250 and subsequent loading of the workpiece assembly 1250 into the milling machine 10, and a robotic assembly 1500 for moving the workpiece assembly 1250 between the infeed conveyor assembly 1400, the milling machine 10, and the outfeed conveyor assembly 1300.

The outfeed conveyor assembly 1300 is configured to support and carry the machined workpiece assembly 1250 or the machined workpiece 1050 along the outfeed conveyor assembly 1300 from a first end 1301, nearest the milling machine 10, toward a second end 1303, opposite the first end 1301 and further from the milling machine 10 than the first end 1301. A collet removal station 1320 (FIG. 25) is located at the first end 1301, where at least one collet 1100 is removed or detached from the workpiece 1050 to disassemble the workpiece assembly 1250. The machined workpiece 1050 can be carried by the outfeed conveyor assembly 1300 from the first end 1301 toward the second end 1303, away from the milling machine 10, after the at least one collet 1100 is removed at the collet removal station 1320. The outfeed conveyor assembly 1300 comprises a first frame 1302 supporting a plurality of conveyors 1304. A motor 1306 is operably coupled with the conveyors 1304 by a drive shaft 1308 for driving rotation of the conveyors 1304 to convey the machined workpiece 1050 along the outfeed conveyor assembly 1300.

The infeed conveyor assembly 1400, similar to the outfeed conveyor assembly 1300, is configured to support and carry the workpiece 1050 along the infeed conveyor assembly 1400 from a first end 1401 toward a second end 1403. However, unlike the outfeed conveyor assembly 1300, the second end 1403 of the infeed conveyor assembly 1400 is nearest the milling machine 10, while the first end 1401 is opposite the second end 1403 and is further from the milling machine 10 than the first end 1401 is. A collet mounting station 1420 is located at the second end 1403, where at least one collet 1100 is mounted to the workpiece 1050 to form the workpiece assembly 1250. The workpiece 1050 can be carried by the infeed conveyor assembly 1400 from the first end 1401 toward the second end 1403, toward the milling machine 10, prior to the mounting of the at least one collet 1100 to the workpiece 1050 at the collet mounting station 1420. The infeed conveyor assembly 1400 comprises a second frame 1402 supporting a plurality of conveyors 1404. A motor 1406 is operably coupled with the conveyors 1404 by a drive shaft 1408 for driving rotation of the conveyors 1404 to convey the workpiece 1050 along the infeed conveyor assembly 1400.

A workpiece aligning station 1410 is located at or adjacent the first end 1401 of the infeed conveyor assembly 1400 for orienting, aligning, and indexing the workpiece 1050 on the infeed conveyor assembly 1400 to be provided to the collet mounting station 1420. The collet mounting station 1420 can be positioned adjacent the second end 1403, such as just before the second end 1403, and comprises at least one frame member 1422 supporting a guide, member 1424. The infeed conveyor assembly 1400 further optionally comprises a lifting assembly 1430 at or adjacent the second end 1403, such as opposite the collet mounting station 1420 about the second end 1403.

The robotic assembly 1500 is movable within the automatic loading assembly 1000 for carrying the workpiece assembly 1250 from the infeed conveyor assembly 1400 to the milling machine 10 to be inserted into the at least one chuck 40 and from the milling machine 10 to the outfeed conveyor assembly 1300 after removal of the workpiece assembly 1250 from the at least one chuck 40. The robotic assembly 1500 comprises a robotic body 1502 and at least one robotic arm 1504 mounted to and carried by the robotic body 1502. The robotic arm 1504 defines a first end, illustrated as a base 1503, that mounts the robotic arm 1504 to the robotic body 1502 and an opposing, second end 1505 that carries a guide member 1510.

Figure 25:
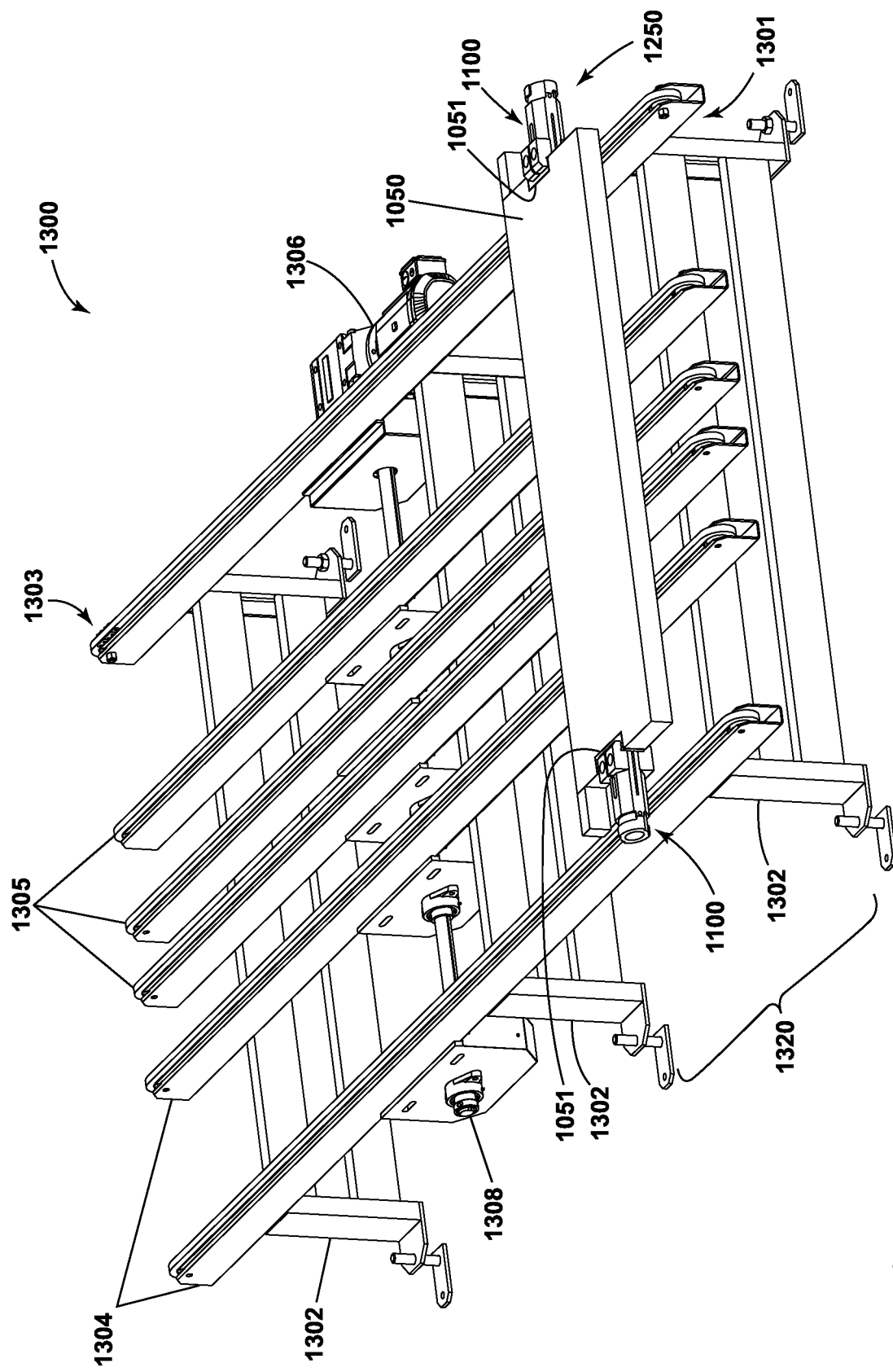
FIG. 25 is an enlarged perspective view of the first conveyor assembly of FIG. 24, and including another example of a collet and a workpiece to form another example of a workpiece assembly for use with the automatic loading assembly, the milling machine, and the chuck of FIG. 24.

The outfeed conveyor assembly 1300 is better seen in the enlarged view of FIG. 25. The first frame 1302 extends substantially across the width of the outfeed conveyor assembly 1300 and supports the plurality of conveyors 1304 that extend between the first end 1301 and the second end 1303, generally orthogonal to the first frame 1302. Each of the conveyors 1304 includes a movable belt 1305 for conveying the workpiece 1050 from the first end 1301 to the second end 1303. The drive shaft 1308 is an output shaft for the motor 1306 and is operably coupled with, each of the conveyors 1304 to drive rotation of the movable belts 1305. The outfeed conveyor assembly 1300 is illustrated with the collet removal station 1320, but without the collet mounting station 1420, workpiece aligning station 1410, or the lifting assembly 1430 as in the infeed conveyor assembly 1400, to allow for a more manual or less automated approach to disassembling the workpiece assembly 1250 that can be used within the context of the automatic loading assembly 1000, and, alongside the infeed conveyor assembly 1400, but that does not require the precision of positioning, alignment, and indexing that is provided for the infeed conveyor assembly 1400 by the collet mounting station 1420, the workpiece aligning station 1410, and the lifting assembly 1430.

Turning to the operation of the outfeed conveyor assembly 1300, the machined workpiece assembly 1250 that has been removed from the at least one chuck 40, and from the milling machine 10, can be placed on the conveyors 1304 at the first end 1301, such as by the robotic assembly 1500. At least a portion of the first end 1301 can be thought of as comprising the collet removal station 1320. The workpiece 1050 defines at least one collet mounting location 1051 at which the at least one collet 1100 is mounted to the workpiece 1050. In one example, the machined workpiece assembly 1250 can be placed on the first end 1301 of the outfeed conveyor assembly 1300 by the robotic assembly 1500 at the portion of the first end 1301 that forms the collet removal station 1320, and specifically such that the at least one collet mounting location 1051 is aligned with the collet removal station 1320. Alternatively, the machined workpiece assembly 1250 may need to be conveyed by the outfeed conveyor assembly 1300 from its initial position to reach the collet removal station 1320. In such a case, operation of the motor 1306 rotates the drive shaft 1308, which in turn drives rotation of the movable belts 1305 of the conveyors 1304. As the movable belts 1305 are rotated, the machined workpiece assembly 1250 is conveyed from the first end 1301 to the collet removal station 1320, and at least partially toward the second end 1303.

Whether the machined workpiece assembly 1250 has been conveyed from the first end 1301 to the point that the collet mounting location 1051 of the workpiece 1050 is aligned with the collet removal station 1320, or whether the robotic assembly 1500 places the machined workpiece assembly 1250 onto the outfeed conveyor assembly 1300 at the position at which the collet mounting location 1051 is aligned with the collet removal station 1320, operation of the conveyors 1304 is stopped when the at least one collet mounting location 1051 is aligned with the collet removal station 1320. The stopping of the machined workpiece assembly 1250 such that the collet mounting location 1051 is aligned with the collet removal station 1320 can be thought of as corresponding to an indexed position of the workpiece 1050, and of the machined workpiece assembly 1250, relative to the outfeed conveyor assembly 1300.

At this indexed position of the workpiece 1050 and the workpiece assembly 1250 relative to the outfeed conveyor assembly 1300, the at least one collet 1100 can be removed from the at least one collet mounting location 1051 of the workpiece 1050 to disassemble the machined workpiece assembly 1250, such as, by way of non-limiting example, by manual detachment of the at least one collet 1100 from the workpiece 1050 by the operator using the handheld actuating assembly 150 as described previously with respect to the collet 100. Thus, the disassembly of the machined workpiece assembly 1250 can include, though is not limited to, manual action by the operator, in combination with the automated removal of the machined workpiece assembly 1250 from the milling machine 10 and the carrying of the machined workpiece assembly 1250 by the robotic arm 1504 to be automatically delivered to the outfeed conveyor assembly 1300 from the milling machine 10.

With the at least one collet 1100 removed from the workpiece 1050, the motor 1306 can again be operated, in the same manner as described previously, to move the machined workpiece 1050 along the conveyors 1304, away from the collet removal station 1320 and further toward the second end 1303. By conveying the machined workpiece 1050 to or near the second end 1303 of the outfeed conveyor assembly 1300, the machined workpiece 1050 is then positioned relative to the outfeed conveyor assembly 1300 so as to be more easily accessible, such as by an operator or by another automation or robotic assembly, for removal from the outfeed conveyor assembly 1300 and from the automatic loading assembly 1000. However, it will be, understood that the machined workpiece 1050 need not be further conveyed from the collet removal station 1320 toward the second end 1303, and could instead be removed directly from the collet removal station 1320, without further operation of the conveyors 1304.

Figure 26:
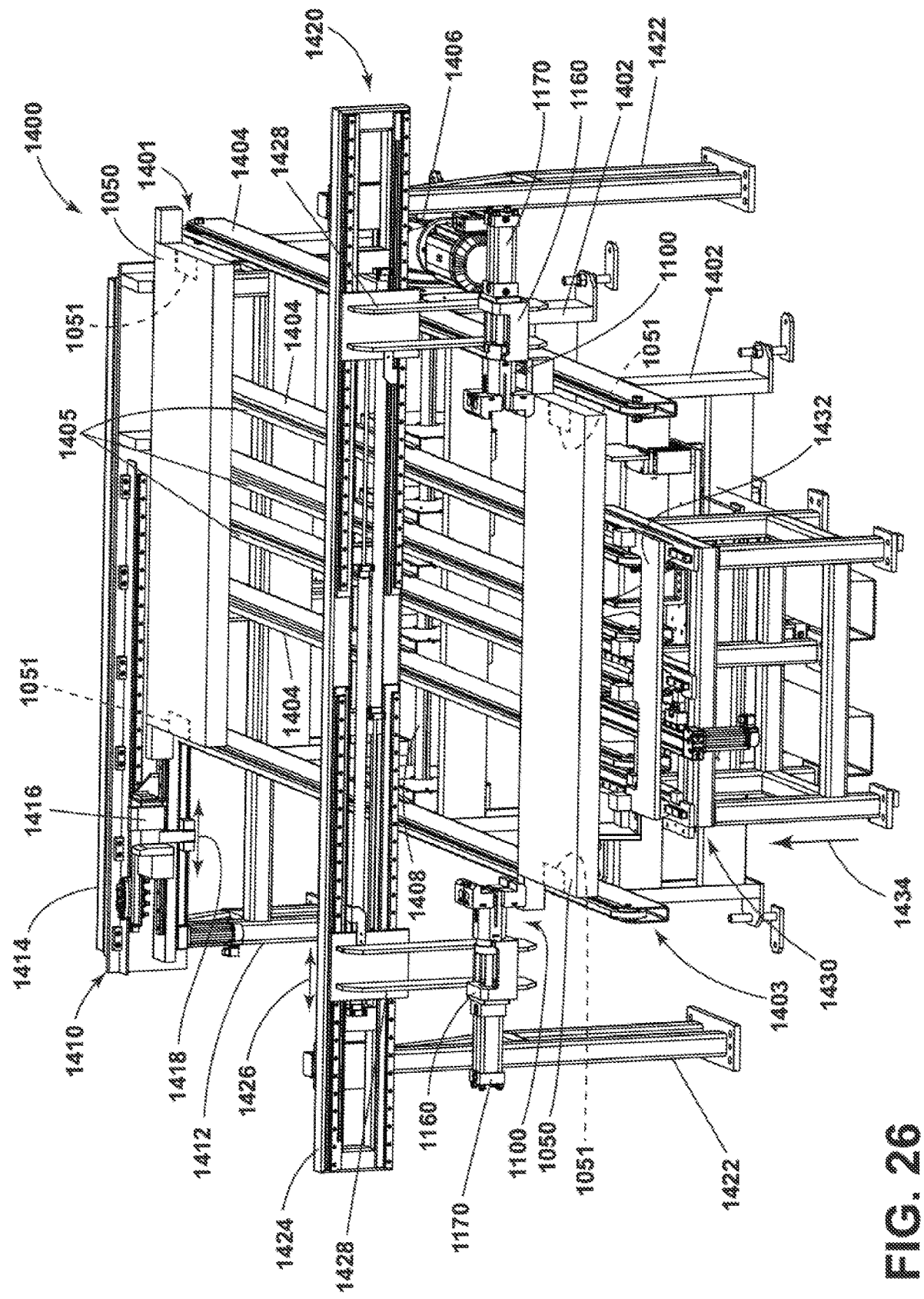
FIG. 26 is an enlarged perspective view of the second conveyor assembly of FIG. 24, including the collet and the workpiece of FIG. 25.

The infeed conveyor assembly 1400 is best seen in the enlarged view of FIG. 26. The second frame 1402, the first end 1401, the second end 1403, the conveyors 1404, the motor 1406, and the drive shaft 1408 are illustrated and are operable in the same way as described with respect to the outfeed conveyor assembly 1300, with the motor 1406 driving rotation of movable belts 1405 via the drive shaft 1408 as described with respect to the outfeed conveyor assembly 1300, with an exception that the conveyors 1404 of the infeed conveyor assembly 1400 move the workpieces 1050 toward the milling machine 10, while the conveyors 1304 of the outfeed conveyor assembly 1300 move the workpieces 1050 away from the milling machine 10. In addition, rather than the collet removal station 1320 of the outfeed conveyor assembly 1300, the infeed conveyor assembly 1400 instead includes the collet mounting station 1420. Further yet, rather than including involvement of or manual operation by the operator, as with the removal of the at least one collet 1100 from the workpiece 1050 at the collet removal station 1320 of the outfeed conveyor assembly 1300, the infeed conveyor assembly 1400 instead includes the collet mounting station 1420, the workpiece aligning station 1410, and the lifting assembly 1430 to further automate and to improve the precision of at least some of the process steps for mounting the at least one collet 1100 to the workpiece 1050 to form the workpiece assembly 1250, such that less operator involvement is needed relative to the outfeed conveyor assembly 1300.

The workpiece aligning station 1410 is located at the first end 1401 and ensures proper alignment of the workpiece 1050 on the conveyors 1404 prior to conveying the workpiece 1050 to the collet mounting station 1420. The workpiece aligning station 1410 comprises at least one frame member 1412 supporting a guide member 1414 that extends across at least a portion of the width of the infeed conveyor assembly 1400. The guide member 1414 carries a contact element 1416 that is movably mounted to the guide member 1414 for movement in a side-to-side direction, as indicated by the arrow 1418, along at least a portion of the longitudinal width of the guide member 1414 to contact and selectively bear against the workpiece 1050 as needed to bias or guide the workpiece 1050 into a desired alignment and orientation relative to the infeed conveyor assembly 1400.

In one example, the workpiece aligning station 1410 comprises a visual system (not shown) for determining the orientation of the workpiece 1050 on the conveyors 1404 and for determining the at least one collet mounting location 1051 on the workpiece 1050. By way of non-limiting example, the visual system can be operated to scan a bar code on the workpiece 1050 in order to receive information of the at least one collet mounting location 1051 and to determine the position or location of the at least one collet mounting location 1051 on the workpiece 1050. Once the at least one collet mounting location 1051 has been determined, the orientation of the workpiece 1050 can be determined and the workpiece aligning station 1410 can be operated to move the contact element 1416 to bear against and bias the workpiece 1050 into the proper orientation, alignment, and indexed position relative to the infeed conveyor assembly 1400, for the workpiece 1050 to then be conveyed to the collet mounting station 1420.

In the illustrated example, the collet mounting station 1420 comprises two frame members 1422 positioned on opposite sides of the infeed conveyor assembly 1400 and supporting the guide member 1424 that extends between the two frame members 1422, across at least the entire width of the infeed conveyor assembly 1400, and is located above the infeed conveyor assembly 1400. The guide member 1424 carries at least one carrier 1428 that is movably mounted to the guide member 1424 for movement in the side-to-side direction, as indicated by the arrow 1426, such that the guide member 1424 defines a collet movement path of the collet mounting station 1420 for travel by the at least one carrier 1428 in the direction of the arrow 1426. In one example, two carriers 1428 are movably mounted to the guide member 1424 opposite one another across the conveyors 1404. Each of the carriers 1428 can removably carry a collet 1100, each collet 1100 coupled with a piston assembly 1170 via a second coupling 1160 for actuating the collet 1100. The piston assembly 1170 can comprise the entire handheld actuating assembly 150 as previously described, or may include any suitable removably couplable piston assembly 1170 capable of operating as previously described with respect to the piston assembly 170 to actuate the collet 100. In this way, each collet 1100 is movable along the collet movement path, as indicated by the arrow 1426, relative to the workpiece 1050 to be selectively brought into contact with the workpiece 1050, and specifically into contact with each collet mounting location 1051. The carriers 1428, and thus also the corresponding collets 1100, can be movable along the collet movement path, as indicated by the arrow 1426, either independently of one another, or in cooperation with one another.

The lifting assembly 1430 is positioned generally downstream of the collet mounting station 1420 with respect to the conveyors 1404, but with at least a portion of the lifting assembly 1430 at least partially underlying the collet mounting station 1420, and specifically the collet movement path. The lifting assembly 1430 comprises at least one lifting member 1432 that can be selectively vertically raised in the direction of the arrow 1434 so as to lift the workpiece 1050 vertically upward from, off of, and above the conveyors 1404. In one example, the at least one lifting member 1432 is aligned with the workpiece 1050 to lift the workpiece 1050 when the at least one collet mounting location 1051 of the workpiece 1050 is aligned with the collet mounting station 1420, corresponding to the indexed position of the workpiece 1050.

Turning to the operation of the infeed conveyor assembly 1400, the workpiece 1050 can be placed on the conveyors 1404 at the first end 1401, either by an operator or by an automated assembly. The workpiece aligning station 1410 is operated to scan the bar code from the workpiece 1050 to determine the orientation and position of the workpiece 1050 on the conveyors 1404 and to determine the at least one collet mounting location 1051 of the workpiece 1050. The contact element 1416 can then be operated to bear against the workpiece 1050 to adjust the alignment, orientation, or indexed position of the workpiece 1050 as, needed. When the workpiece 1050 is properly positioned, the motor 1406 is operated to drive the movable belts 1405 and to convey the workpiece 1050 from the first end 1401 toward the second end 1403. When the workpiece 1050 is conveyed to reach the indexed position, where the at least one collet mounting location 1051 is aligned with the collet mounting station 1420, and specifically with the collet movement path defined by the collets 1100 as carried by the carriers 1428 in the direction of the arrow 1426, operation of the movable belts 1405 is ceased.

Optionally, if needed to bring the workpiece 1050 vertically into alignment with the collet movement path, the lifting assembly 1430 can then be operated to lift the workpiece 1050 upwardly from the conveyors 1404 and into vertical alignment with the at least one collet 1100. For example, it may be necessary to raise the workpiece 1050 up from the conveyors 1404 in order to allow appropriate clearance between the workpiece 1050 and the conveyors 1404 to allow access of the at least one collet 1100 to the at least one collet mounting location 1051. When the workpiece 1050, and specifically the collet mounting location 1051, is both horizontally and vertically aligned with the collet movement path, and with the at least one collet 1100, the carriers 1428 are moved relative to the guide member 1424, such as via manual movement of the carriers 1428 by the operator or automatic movement of the carriers 1428 along the guide member 1424, to move the collets 1100 along the collet movement pathway and toward the workpiece 1050 until at least a portion of the workpiece 1050 at the at least one collet mounting location 1051 is received between fingers 1104 (FIG. 27), and specifically between clamp elements 1140 (FIG. 27), of the collet 1100. As described previously with respect to FIGS. 12-14, for the workpiece 1050 to be received between the fingers 1104, the fingers 1104 must be biased to the unclamped position and to the deflected or biased state by a biasing force applied via actuating the piston assembly 1170. After the workpiece 1050 is received between the fingers 1104, the biasing force from the piston assembly 1170 is removed, allowing the fingers 1104 to return to the clamped position and to the non-deflected or unbiased state. Once the at least one collet 1100 is mounted to the workpiece 1050, the workpiece assembly 1250 comprising the workpiece 1050 and the at least one collet 1100 is formed. The workpiece assembly 1250 is then assembled and ready to be carried by the robotic arm 1504 to be automatically loaded into the milling machine 10.

With the workpiece assembly 1250 thus formed, the robotic assembly 1500 is used to execute a method of automatic loading of the workpiece 1050, specifically the workpiece assembly 1250, into the milling machine 10 having the rotating chuck 40, by carrying the workpiece assembly 1250 with the robotic arm 1504 to the milling machine 10 such that the at least one collet 1100 can be inserted into the at least one chuck 40. The robotic arm 1504 is best seen in the enlarged partial view of FIG. 27. For clarity, the robotic body 1502 is not shown, though it will be understood that the base 1503 mounts the robotic arm 1504 to the robotic body 1502. The robotic arm 1504, in particular the second end 1505, supports the guide member 1510, such as by suspending the guide member 1510 from the second end 1505. The guide member 1510 carries at least one carrier 1512 that is movably mounted to the guide member 1510 for movement along at least a portion of the longitudinal width of the guide member 1510 to accommodate and carry workpieces 1050 of various sizes, shapes, and lengths. In one example, the guide member 1510 carries two carriers 1512. It is contemplated that both of the carriers 1512 can be movably mounted to the guide member 1510, or that only one of the carriers 1512 is movable mounted to the guide member 1510 while the other carrier 1512 is fixedly mounted to the guide member 1510.

At least one of the carriers 1512 further mounts a tool 1520 such that the tool 1520 is mounted to the second end 1505 of the robotic arm 1504 via the at least one carrier 1512. In one example, each of the two carriers 1512 mounts a tool 1520. By way of non-limiting example, the tool 1520 can be a clamping tool 1520, though it will be understood that any suitable tool for grasping the collet 1100 can be provided, regardless of whether or not clamping force is applied by the tool 1520. The tools 1520 allow the robotic assembly 1500 to grasp and pick up the workpiece assembly 1250 that has been formed at the collet mounting station 1420 of the infeed conveyor assembly 1400, to carry the workpiece assembly 1250 with the robotic arm 1504 to the milling machine 10, and also to grasp and pick up the machined workpiece assembly 1250 that has been machined by the milling machine 10 to remove the machined workpiece assembly 1250 from chuck 40 and from the milling machine 10, and then to carry the machined workpiece assembly 1250 with the robotic arm 1504 to the outfeed conveyor assembly 1300. Specifically, the tools 1520 grasp the collets 1100 to carry the workpiece assembly 1250.

Figure 28:
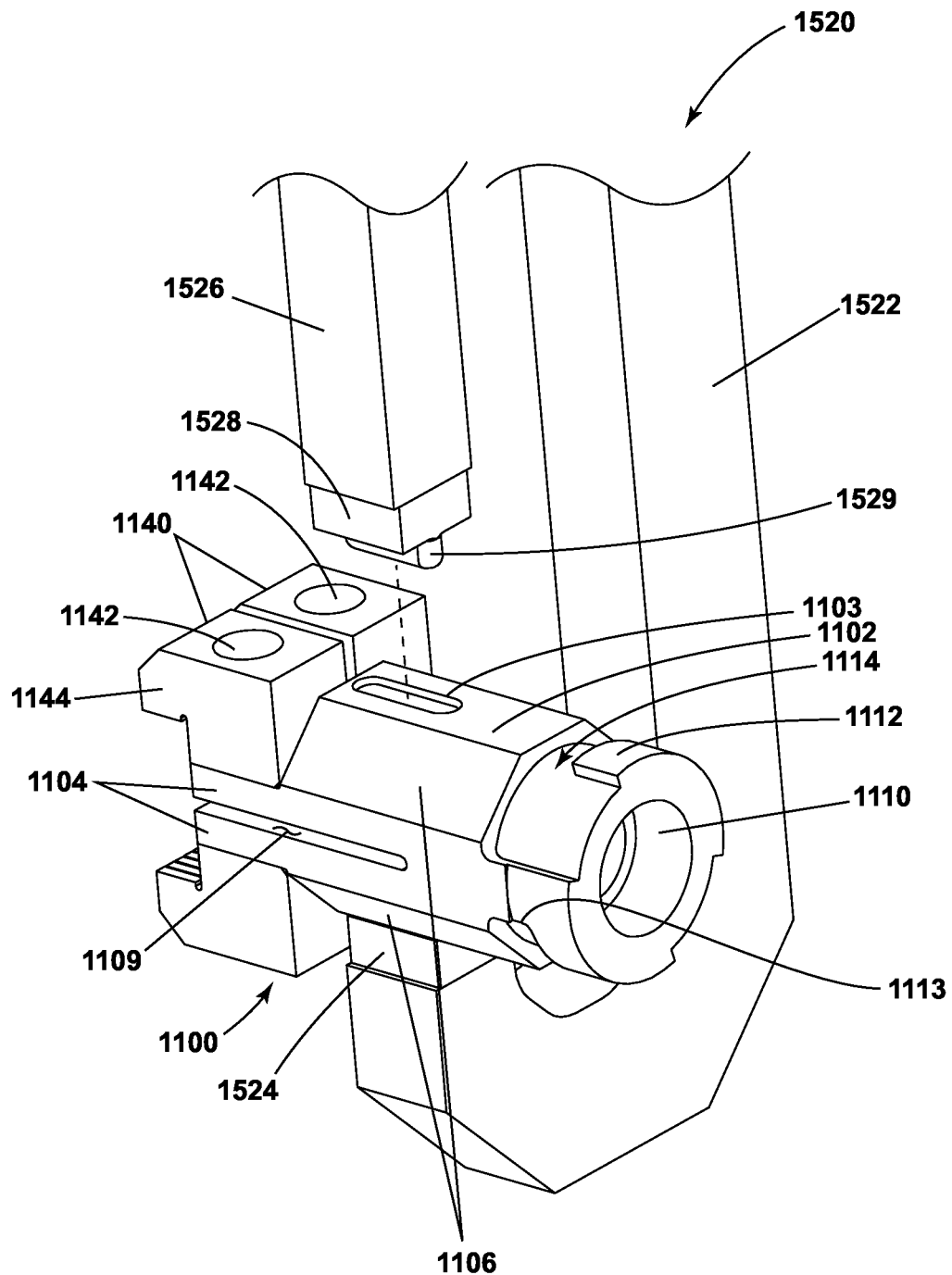
FIG. 28 is an enlarged perspective view of a portion of the tool and the collet of FIG. 27.

Each tool 1520 comprises a first arm, illustrated as a lower arm 1522, and a second arm, illustrated as an upper arm 1526. At least one of the lower arm 1522 and the upper arm 1526 is movable between a grasping position and a non-grasping position relative to the carrier 1512. As illustrated, the lower arm 1522 is fixed relative to the carrier 1512, while the upper arm 1526 is movable relative to the carrier 1512 between the grasping position, as shown, and the non-grasping position (FIG. 28). The lower arm 1522 has an upper end 1523 that is fixedly coupled to the carrier 1512. The lower arm 1522 extends downwardly away from the upper end 1523 to define a J-shaped profile terminating at a grasping end 1524 opposite the upper end 1523. The grasping end 1524 interacts with a lower surface of the collet 1100 to grasp the collet 1100 when the workpiece assembly 1250 is grasped within the tool 1520 in the grasping position.

The upper arm 1526 has an upper end 1527 that is movably coupled relative to the carrier 1512. An actuator 1514 is fixedly coupled to the carrier 1512 and is further operably coupled with an output shaft 1516. The output shaft 1516 is coupled to the upper end 1527 to operably couple the actuator 1514 with the upper arm 1526. The output shaft 1516 is fixedly coupled to the upper end 1527 such that, both the output shaft 1516 and the upper end 1527 are reciprocatingly movable relative to the actuator 1514 between the grasping position and the non-grasping position. The upper arm 1526 extends downwardly away from the upper end 1527 to terminate at a grasping end 1528 opposite the upper end 1527. The grasping end 1528 interacts with an upper surface of the collet 1100 to grasp the collet 1100 when the workpiece assembly 1250 is grasped within the tool 1520 in the grasping position.

FIG. 28 illustrates a portion of the tool 1520 in the non-grasping position relative to the workpiece assembly 250, and specifically relative to the collet 1100, and with the workpiece 1050 omitted for clarity. The upper arm 1526 is shown in the non-grasping position, where the upper arm 1526 is raised upwardly away from the collet 1100 such that the grasping end 1528 does not interact with or grasp the collet 1100. With the upper arm 1526 in the non-grasping position, it can be seen that the grasping end 1528 further comprises a projection, illustrated as a rib 1529, extending downwardly from the grasping end 1528, to interact with and help to grasp the collet 1100.

The structural details of the collet 100 are also best seen in FIG. 28. The collet 1100 is similar to the collet 100 in most aspects, but differs from the collet 100 in the shape of the clamp elements 1140 and clamp tooling 1144, as well as in the inclusion of a groove 1103 with the collet 1100. The arrangement and description of a first coupling 1110, a rib 1112, a rotational stop 1113, a channel 1114, a collet body 1102, the fingers 1104, flats 1106, a gap 1109 between the fingers 1104, and fastener openings 1142, and of the function of the clamp tooling 1144, as well as of the attachment of the clamp elements 1140 to the workpiece 1050 to form the workpiece assembly 1250 is still the same and can be operated in the same manner as in the collet 100. At least one surface of the collet body 1102 that is not any of the flats 1106 can include the groove 1103. The groove 1103 has a width that is greater than the width of the gap 1109 between the fingers 1104, and further is sized and shaped so as to be complementary with the rib 1529 of the upper arm 1526 such that the rib 1529 can be at least partially received within the groove 1103. The groove 1103 can be included on a surface that does not already include the gap 1109, or the groove 1103 can be provided on a surface along with the gap 1109 such that the groove 1103 comprises a portion of the gap 1109 having an increased width.

Figure 27:
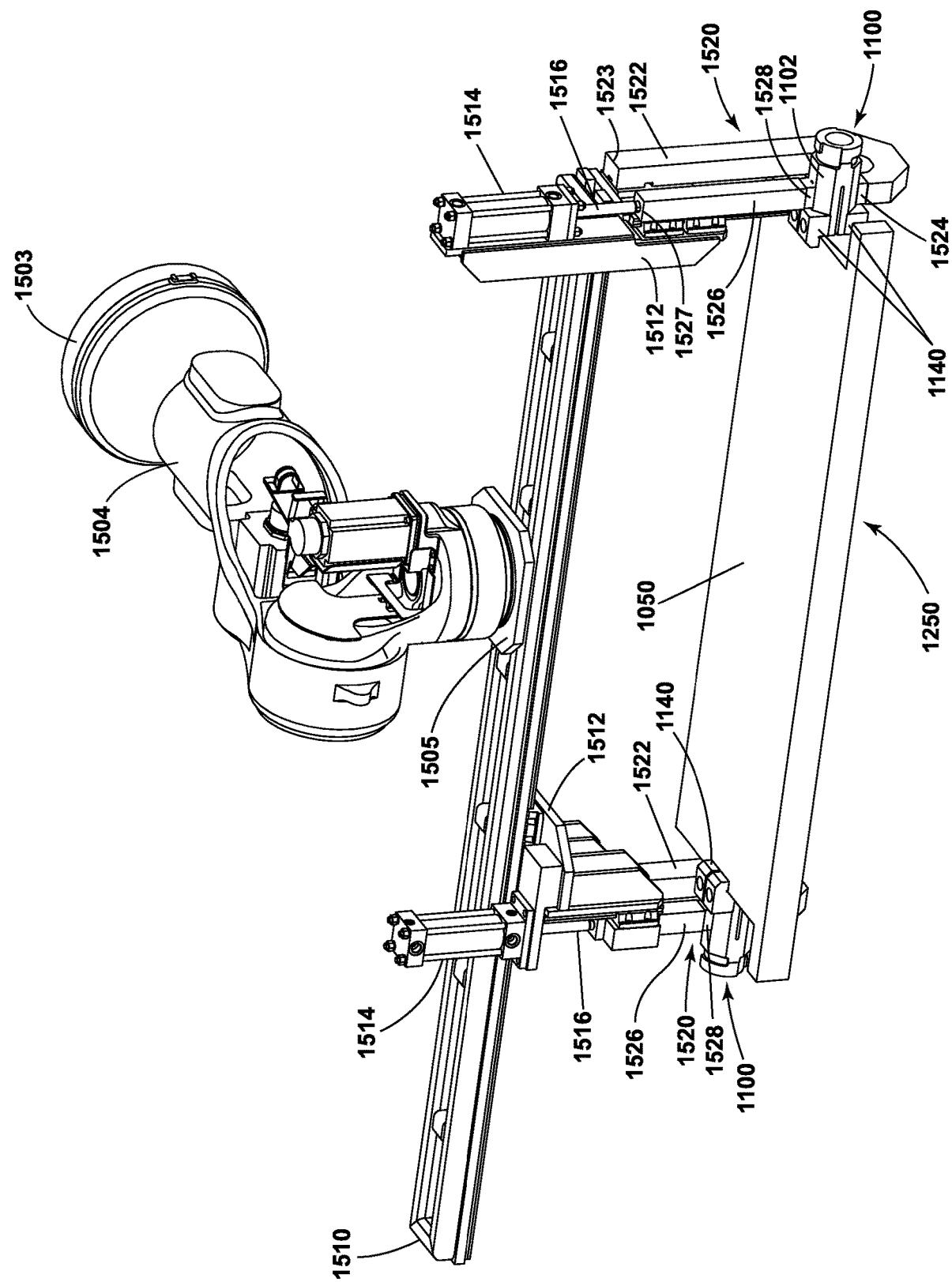
FIG. 27 is an enlarged perspective view of a portion of the robotic assembly of FIG. 24, including a robotic arm and a tool for use with the collet, the workpiece, and the workpiece assembly of FIG. 25.
Figure 29:
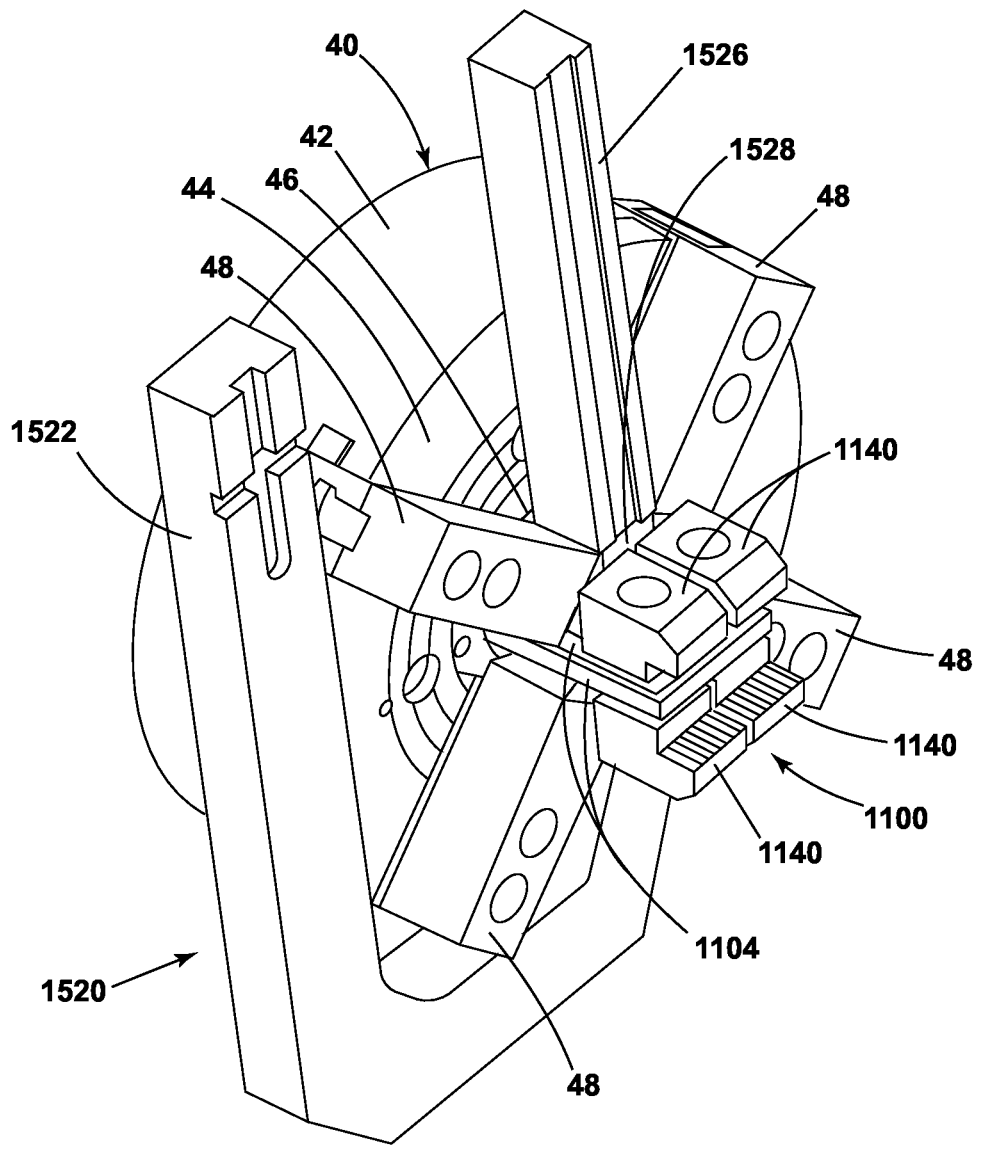
FIG. 29 is a perspective view of the portion of the tool and the collet of FIG. 28 with the collet received within the chuck of FIG. 1.

When the at least one tool 1520 grasps the at least one collet 1100 in the grasping position as shown in FIG. 27 such that the workpiece assembly 1250 can be carried by the robotic arm 1504, the robotic assembly 1500 can carry the workpiece assembly 1250 to or from the milling machine 10 for the at least one collet 1100 to be inserted into or removed from the chuck 40. FIG. 29 best shows the arrangement of the parts when the at least one tool 1520 grasps the at least one collet 1100 in the grasping position and the collet 1100 is inserted into the chuck 40. The arrangement of the collet 1100 and its components relative to the chuck 40 is the same as previously described with respect to the collet 100 and the workpiece assembly 250 received within the chuck 40. The tool 1520, and specifically the shape and dimensions of the lower arm 1522 and the upper arm 1526 can be designed specifically to fit around the components of the chuck 40 while still grasping the collet 1100 and carrying the workpiece assembly 1250 in the grasping position.

For example, with the collet 1100 inserted into the chuck 40 and with the tool 1520 grasping the collet 1100, the upper arm 1526 is received between the two upper clamping jaws 48 of the chuck 40 and extends along the front surface 44. The lower arm 1522 similarly has at least a portion that is received between the two lower clamping jaws 48 of the chuck 40 and extends along the front surface 44. Further, the J-shaped profile of the lower arm 1522 can be sized and positioned specifically such that the lower arm 1522 is wide enough to accommodate the clamping jaws 48 within its width without overlapping with the clamping jaws 48, which would prevent the lower arm 1522 from moving further toward the front surface 44 and would therefore also prevent complete insertion of the collet 100 into the chuck opening 46.

Figure 30:
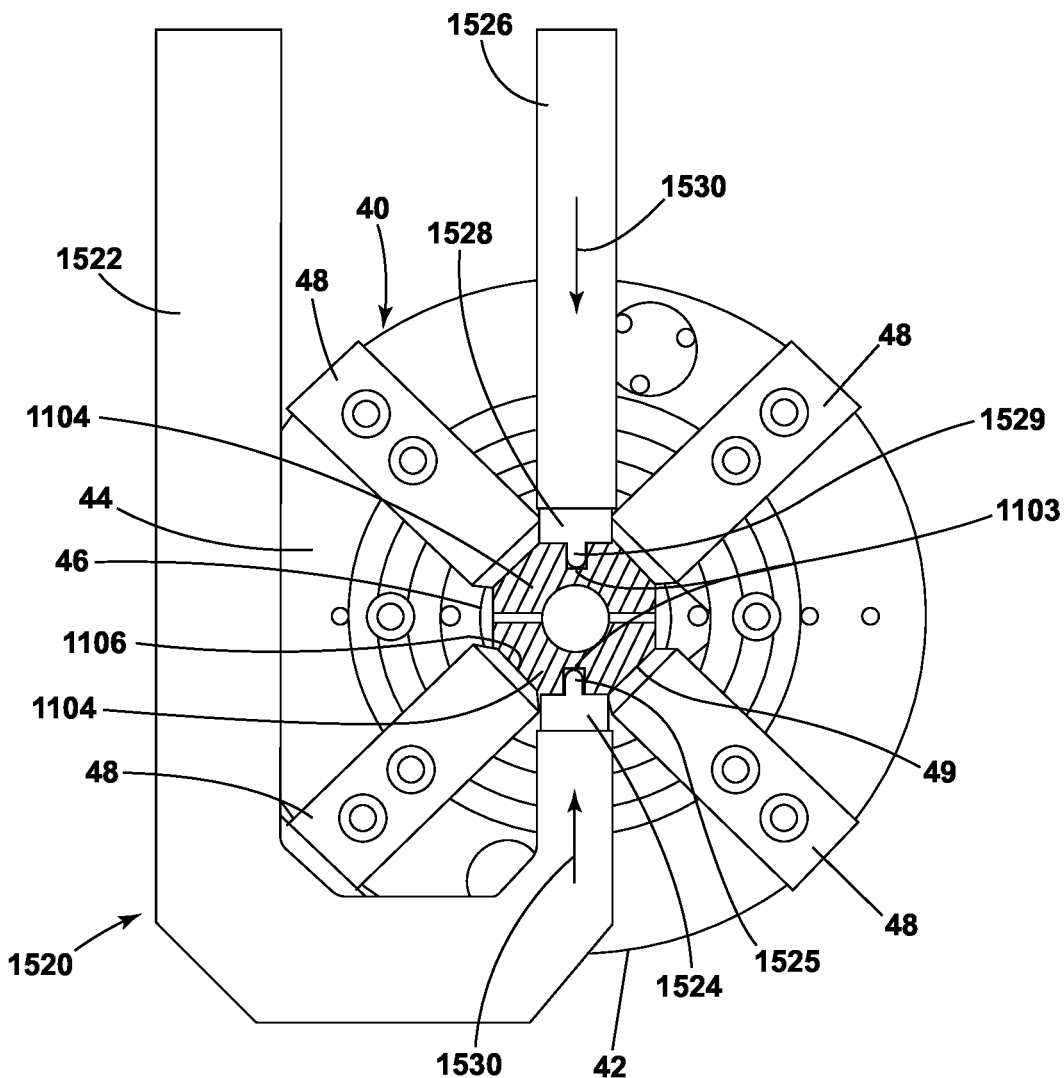
FIG. 30 is a front cross-sectional view of the portion of the tool and the collet received within the chuck of FIG. 29.

The grasping of the collet 1100 by the tool 1520 with the tool 1520 in the grasping position is best seen in the cross-sectional view of FIG. 30 illustrating, in one example, the collet 1100 including two opposing surfaces of the collet body 1102 that are not any of the flats 1106 include the groove 1103. The positioning of at least portions of the lower arm 1522 and the upper arm 1526 so as to be received between clamping jaws 48 of the chuck 40 can also be better seen. Further, like the grasping end 1528 of the upper arm 1526 includes the rib 1529, the grasping end 1524 of the lower arm 1522 also comprises a projection, illustrated as a rib 1525, extending upwardly from the grasping end 1524, to interact with and help to grasp the collet 1100. With the tool 1520 in the grasping position, the rib 1529 of the upper arm 1526 is received within one of the grooves 1103, while the rib 1525 of the lower arm 1522 is received within the opposing one of the grooves 1103.

In this way, because the grasping ends 1524, 1528 grasp against opposing surfaces of the collet 1100, in one example, the grasping ends 1524, 1528, and thus also the lower arm 1522 and the upper arm 1526, can apply a clamping force inwardly against one another and against the collet 1100, specifically against the fingers 1104 of the collet 1100, in the direction indicated by the arrows 1530. By the tool 1520 exerting the clamping force inwardly against the fingers 1104, the tool 1520, collet 1100, and the workpiece assembly 1250 are increasingly able to retain and to carry workpieces 1050 having significant weight because the additional clamping force of the tool 1520 ensures that the workpiece 1050 will remain resiliently retained and grasped within the collet 1100. By way of non-limiting example, the clamping force applied by the tool 1520 against the collet 1100 is 2,500 pounds of clamping force.

Turning now to the operation of the automatic loading assembly 1000, workpiece assemblies 1250 are formed at the collet mounting station 1420 of the infeed conveyor assembly 1400 at the second end 1403 as previously described, where the workpiece assemblies 1250 then await carrying to the milling machine 10 to be inserted into the chuck 40. When the workpiece assembly 1250 is ready to be picked up by the robotic arm 1504, the robotic assembly 1500 moves to the appropriate position approaching the infeed conveyor assembly 1400. Through movement of the robotic body 1502 across the floor, through movement, such as extension, of the robotic arm 1504 relative to the robotic body 1502, or through a combination of both, the tools 1520 are extended toward and aligned with the collets 1100 of the workpiece assembly 1250. As the tools 1520 approach the collets 1100, at least the upper arms 1526 of the tools 1520 are actuated by the actuator 1514 to be in the non-grasping position. The lateral position of the tools 1520 relative to the length of the guide member 1510 can also be adjusted to accommodate the length of the workpiece 1050 within the workpiece assembly 1250.

In one example, the tools 1520 are moved toward the collets 1100 until the ribs 1525, 1529 are aligned with the grooves 1103 on the collets 1100. The tools 1520 can then be moved upwardly until the rib 1525 of the lower arm 1522 is received within one of the grooves 1103. The tools 1520 can then be held still from further movement while just the upper arms 1526 are actuated by the actuator 1514 to reciprocate downwardly until the rib 1529 of the upper arm 1526 is likewise received within the other of the grooves 1103 to reach the grasping position of the tools 1520 relative to the workpiece assembly 1250. At this point, the tools 1520 are clamped to apply the clamping force to the fingers 1104 of the collet 1100, and the workpiece assembly 1250, specifically the collets 1100, is resiliently retained within the tools 1520 in the grasping position, and the workpiece assembly 1250 can thus be carried by the robotic arm 1504.

The robotic assembly 1500 can then be moved, to lift the workpiece assembly 1250 off of the infeed conveyor assembly 1400 and to carry the workpiece assembly 1250 to the milling machine 10. The robotic assembly 1500 and the robotic arm 1504 maneuver the workpiece assembly 1250 carried by the tools 1520 into the milling machine 10 until at least one of the collets 1100 is aligned with the chuck opening 46 of at least one chuck 40. The at least one collet 1100 extending from the workpiece assembly 1250, particularly the chuck mount portion, is then inserted into the chuck opening 46 until the clamping jaws 48 receive the collet body 1102 and at least a portion of the fingers 1104 to which the clamp elements 1140 are not attached and at least a portion of the upper arm 1526 and the lower arm 1522 are, received between clamping jaws 48 of the chuck 40 and are adjacent to or abutting the front surface 44 of the chuck 40. The tools 1520 continue to hold the workpiece assembly 1250 and the collets 1100 in place until the clamping jaws 48 have tightened sufficiently to clamp against the flats 1106 of the collet 1100 received within the chuck 40.

In the case that a second collet 1100 at the opposing end of the workpiece assembly 1250 is also to be received within a chuck 40, the chuck 40 can be brought toward the second collet 1100 to align with the second collet 1100. As the workpiece assembly 1250 is fixedly retained within the first chuck 40, the workpiece assembly 1250 is not movable toward the second chuck 40. Instead, the second chuck 40 can be brought toward the second collet 1100 to surround at least the chuck mount portion of the second collet 1100 within the chuck opening 46 as described with respect to the first collet 1100 and the clamping jaws 48 brought into the clamped position about the second collet 1100. With both collets 1100 clamped within the clamping jaws 48 to mount the workpiece assembly 1250 to the chucks 40, the tools 1520 can then be withdrawn. The actuator 1514 is actuated to reciprocate the upper arms 1526 upwardly until both ribs 1525, 1529 are withdrawn from the grooves 1103 and the upper arms 1526 and lower arms 1522 can be withdrawn from around the components of the chucks 40. The tools 1520 and the robotic arm 1504 are then withdrawn from the milling machine 10. The milling machine 10 can then be operated to execute a machining cycle of operation on the workpiece 1050, while the robotic assembly 1500 is then free to pick up another workpiece assembly 1250 if needed.

When the milling machine 10 has completed the machining cycle of operation to machine the workpiece 1050, forming the machined workpiece assembly 1250, the machined workpiece assembly 1250 can then be removed from the at, least one chuck 40 and from the milling machine 10 by the robotic assembly 1500. The robotic assembly 1500, the robotic arm 1504, and the tools 1520 can again be brought into engagement with the workpiece assembly 1250, returning to the grasping position of the tools 1520 relative to the workpiece assembly 1250 as described previously. When the machined workpiece assembly 1250 is securely retained by the tools 1520 in the grasping position, the clamping jaws 48 of the at least one chuck 40 can be loosened to release the collets 1100. The robotic assembly 1500 can then be moved to remove the machined workpiece assembly 1250 from the at least one chuck 40 in reverse order from what was previously described for the insertion of the workpiece assembly 1250 into the at least one chuck 40. The robotic assembly 1500 is then further moved to remove the machined workpiece assembly 1250 completely from the milling machine 10, and further yet to carry the machined workpiece assembly 1250 from the milling machine 10 to the outfeed conveyor assembly 1300. The machined workpiece assembly 1250 is then placed onto the outfeed conveyor assembly 1300 at the first end 1301 as described previously. The tools 1520 are withdrawn from the at least one collet 1100, allowing the robotic arm 1504 to be withdrawn away from the machined workpiece assembly 1250. The robotic assembly 1500 and the robotic a 1504 are then free to pick up another workpiece assembly 1250 if needed.

Figure 31:
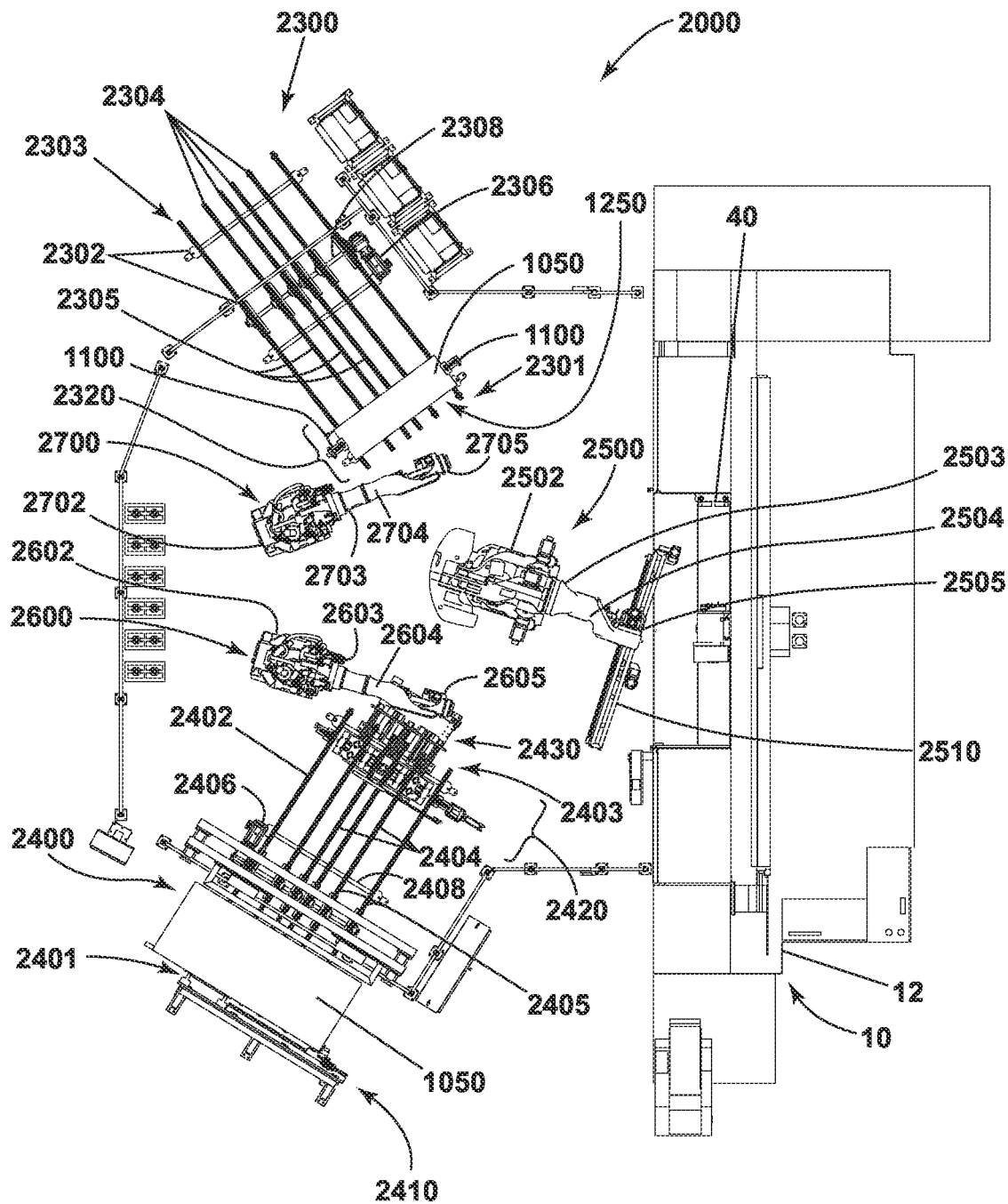
FIG. 31 is a top view of another example of an automatic loading assembly for use with the milling machine and the chuck of FIG. 1 and including another example of a first conveyor assembly, a second conveyor assembly, and a robotic assembly.

FIG. 31 illustrates another example of an optional automatic loading assembly 2000 for use with the milling machine 10 and the chuck 40, as well as with the workpiece 1050, the collet 1100, and the workpiece assembly 1250 as previously described. The automatic loading assembly 2000 comprises an outfeed conveyor assembly 2300, an infeed conveyor assembly 2400, and a robotic assembly 2500 that are similar to the automatic loading assembly 1000, outfeed conveyor assembly 1300, infeed conveyor assembly 1400, and robotic assembly 1500 of FIGS. 24-30, and share many of the same features and components as the automatic loading assembly 1000, outfeed conveyor assembly 1300, infeed conveyor assembly 1400, and, robotic assembly 1500, but differ in some aspects, such as in the components of the infeed conveyor assembly 2400 and in the inclusion of an infeed robotic assembly 2600 and an outfeed robotic assembly 2700. Therefore, elements of the automatic loading assembly 2000, outfeed conveyor assembly 2300, infeed conveyor assembly 2400, and robotic assembly 2500 that are similar to those of the automatic loading assembly 1000, outfeed conveyor assembly 1300, infeed conveyor assembly 1400, and robotic assembly 1500 are identified with numerals increased by 1000, with it being understood that the description of the like parts of the automatic loading assembly 1000, outfeed conveyor assembly 1300, infeed conveyor assembly 1400, and robotic assembly 1500 apply to the automatic loading assembly 2000, outfeed conveyor assembly 2300, infeed conveyor assembly 2400, and robotic assembly 2500, unless otherwise noted.

The outfeed conveyor assembly 2300 is similar to the outfeed conveyor assembly 1300 in most aspects, but differs from the outfeed conveyor assembly 1300 in the inclusion of the outfeed robotic assembly 2700. The arrangement and description of a first end 2301, a second end 2303, a collet removal station 2320, a first frame 2302, a plurality of conveyors 2304, a motor 2306, a drive shaft 2308, and movable belts 2305 is still the same and can be operated in the same manner as in the outfeed conveyor assembly 1300.

The outfeed robotic assembly 2700 is operably coupled with the outfeed conveyor assembly 2300 to remove the at least one collet 1100 from the workpiece 1050 to disassemble the machined workpiece assembly 1250 when the machined workpiece assembly 1250 is in the indexed position at the collet removal station 2320. The outfeed robotic assembly 2700 comprises a robotic body 2702 and at least one robotic arm 2704 mounted to and carried by the robotic body 2702. The robotic arm 2704 defines a first end, illustrated as a base 2703, that mounts the robotic arm 2704 to the robotic body 2702 and an opposing, second end, illustrated as a tooling end 2705, for engaging with the at least one collet 1100 to remove the at least one collet 1100 from the machined workpiece 1050. In one non-limiting example, the robotic body 2702 can be stationary within the automatic loading assembly 2000, with the robotic arm 2704 extendable from the robotic body 2702 to remove collets 1100 from both ends of the workpiece 1050 without requiring movement of the robotic body 2702 relative to the outfeed conveyor assembly 2300.

The operation of the outfeed conveyor assembly 2300 can be identical to the outfeed conveyor assembly 1300, except that, when the machined workpiece assembly 1250 is in the indexed position at the collet removal station 2320, the at least one collet 1100 is removed from the machined workpiece 1050 by the outfeed robotic assembly 2700, and specifically by the tooling end 2705, rather than being removed by the operator.

The infeed conveyor assembly 2400 is similar to the infeed conveyor assembly 1400 in most aspects, but differs from the infeed conveyor assembly 1400 in the inclusion of the infeed robotic assembly 2600 and in the structure of a collet mounting station 2420. The arrangement and description of a first, end 2401, a second end 2403, a second frame 2402, a plurality of conveyors 2404, a motor 2406, a drive shaft 2408, movable belts 2405, a workpiece aligning station 2410, and optionally a lifting assembly 2430 is still the same and can be operated in the same manner as in the infeed conveyor assembly 1400.

The infeed conveyor assembly 2400 differs from the infeed conveyor assembly 1400 in that the collet mounting station 2420, rather than including the at least one frame member 1422 and the guide member 1424, instead is similar to the collet removal station 2320 in that at least a portion of the second end 2403, nearest the milling machine 10, can be thought of as comprising the collet mounting station 2420.

The infeed robotic assembly 2600 is operably coupled with the infeed conveyor assembly 2400 to mount the at least one collet 1100 to the workpiece 1050 to faint the workpiece assembly 1250 when the workpiece 1050 is in the indexed position at the collet mounting station 2420. The infeed robotic assembly 2600 comprises a robotic body 2602 and at least one robotic arm 2604 mounted to and carried by the robotic body 2602. The robotic arm 2604 defines a first end, illustrated as a base 2603, that mounts the robotic arm 2604 to the robotic body 2602 and an opposing, second end, illustrated as a tooling end 2605, for engaging with the at least one collet 1100 to mount the at least one collet 1100 to the workpiece 1050 at the at least one collet mounting location 1051. In one non-limiting example, the robotic body 2602 can be stationary within the automatic loading assembly 2000, with the robotic arm 2604 extendable from the robotic body 2602 to mount collets 1100 to both ends of the workpiece 1050 without requiring movement of the robotic body 2602 relative to the infeed conveyor assembly 2400.

The operation of the infeed conveyor assembly 2400 can be identical to the infeed conveyor assembly 1400, including alignment and indexing at the workpiece aligning station 2410, except that, when the workpiece 1050 is in the indexed position at the collet mounting station 2420, the at least one collet 1100 is mounted to the workpiece 1050 by the infeed robotic assembly 2600, and specifically by the tooling end 2605, rather than being aligned or mounted by the collet mounting station 1420 having the guide member 1424.

The robotic assembly 2500 can be identical to the robotic assembly 1500, with the arrangement and description of a robotic body 2502, at least one robotic arm 2504, a base 2503, and an opposing, second end 2505 that carries a guide member 2510 still the same and operated in the same manner as in the robotic assembly 1500.

The aspects described herein set forth a collet and workpiece assembly and a method of mounting a workpiece to a milling machine that provides improved ease of use over traditional methods. The collet can be mounted to the workpiece outside of the milling machine by use of the handheld actuating assembly, removing space constraints and allowing for secure yet easy mounting of the collet to the workpiece. Additionally, the infeed and outfeed conveyor assemblies can be used to mount and to remove the collet to and from the workpiece in an automated fashion. The collet itself provides a clamping force to retain the workpiece within the collet securely even before the collet is mounted within the chuck. In addition, rather than taking the time to carefully line up and index each workpiece with the milling machine, the mounting of the collet to the workpiece ensures that the workpiece is already properly aligned and indexed and ready for mounting to the milling machine for machining. Because the collet can be mounted to the workpiece outside of the milling machine to form the workpiece assembly that is properly aligned and indexed and, ready to be easily mounted to the chuck for machining, a stock or an inventory of workpiece assemblies with collets mounted to workpieces can be prepared ahead of time and supplied at the ready to the milling machine, either by an operator or by the use of the robotic assembly, which further can improve machining operation efficiency by reducing the downtime between machining operations. Further yet, the collet is designed for easy alignment with the chuck and with the clamping jaws to further reduce the time and effort required in mounting the workpiece to the chuck for machining.

It will also be understood that various changes and/or modifications can be made without departing from the spirit of the present disclosure. By way of non-limiting example, although the present disclosure is described for use with a milling machine, it will be recognized that the collet and assembly can be employed with various types of machines, including a wide variety of CNC machines or other machines for the purpose of machining a workpiece.

To the extent not already described, the different features and structures of the various aspects can be used in combination with each other as desired. That one feature is not illustrated in all of the aspects is not meant to be construed that it cannot be, but is done for brevity of description. Thus, the various features of the different aspects can be mixed and matched as desired to form new aspects, whether or not the new aspects are, expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and, modification are possible within the scope of the forgoing disclosure and drawings without departing from the spirit of the disclosure, which is defined in the appended claims.

What is claimed is:

1. A method of mounting a workpiece to a milling machine having a chuck with clamping jaws, the method comprising:
    providing a clamping collet having a chuck mount portion and moveable clamping fingers for clamping a workpiece to said clamping collet and being movable between an unclamped position for receiving a workpiece and a clamped position for clamping to a workpiece;
    mounting said clamping collet to the workpiece by:
    moving said fingers of said clamping collet to said unclamped position, where a portion of the workpiece can be received between said moveable fingers,
    positioning the workpiece between said moveable fingers, and moving said movable fingers of said clamping collet from said unclamped position to said clamped position, whereby said portion of the workpiece is clamped to said clamping collet by said fingers; and mounting said clamping collet, while mounted to said workpiece, to said milling machine chuck by: inserting said chuck mount portion of said clamping collet into-said chuck and applying a clamping force from said clamping jaws to said clamping collet, whereby said work piece is mounted to said milling machine by clamping said milling machine chuck to said clamping collet, thus avoiding a time consuming necessity of workpiece setup and alignment with the milling machine chuck;

wherein an actuator for moving said clamping collet fingers is operably and releasably coupled to said clamping collet for said steps of moving said fingers of said clamping collet to said unclamped position, and moving said movable fingers of said clamping collet from said unclamped position to said clamped position; and uncoupling said actuator from said clamping collet after said step of moving said movable fingers to said clamped position is performed and prior to said step of mounting said clamping collet to said milling machine chuck.

2. The method of claim 1 wherein the mounting of said clamping collet to said workpiece further comprises indexing said clamping collet relative to the workpiece, such that when said clamping collet is clamped into said chuck, it is properly oriented for correct machining.

3. The method of claim 2 wherein the indexing comprises inserting a key on one of the collet or the workpiece into a keyway on the other of the collet or the workpiece.

4. The method of claim 3 wherein the key is located on at least one of the fingers of the collet.

5. The method of claim 4 wherein the key is a projection and the keyway is a notch.

6. The method of claim 5 wherein the key and the keyway are complementary.

7. The method of claim 1 wherein moving said fingers to said unclamped position comprises deflecting said fingers from said clamped position to said unclamped position.

8. The method of claim 7 wherein the clamping force exerted on said work piece by said fingers of said clamping collet is the inherent resiliency of said fingers in returning from said unclamped position to said clamped position.

9. The method of claim 1 wherein said clamping fingers are specifically configured to be compatible with, and mounted to, a specifically and compatibly configured workpiece, whereby the mounting process can be streamlined and time and effort required can be reduced.

10. The method of claim 9 wherein said fingers of said clamping collet include clamping portions which engage said workpiece and clamp it in place when said fingers are in said clamped position.

11. The method of claim 1 in which said actuator which is provided comprises a piston which can be actuated to extend or retract an actuator shaft, which extends from said actuator into the interior of said clamping collet and engages a mandrel which engages inwardly and forwardly sloping ramps on the interior surfaces of said fingers, such that when said actuator shaft is extended it forces said mandrel forward against said ramp surfaces and deflects said fingers away from each other into said unclamped position allowing insertion of said workpiece, and when retracted retracts said mandrel allowing said fingers to resiliently return to said clamped position clamping said workpiece in said clamping collet.

* * * * *